United States Patent
Russell et al.

(10) Patent No.: US 7,961,622 B2
(45) Date of Patent: Jun. 14, 2011

(54) METHODS, SYSTEMS, AND COMPUTER PROGRAM PRODUCTS FOR MONITORING AND ANALYZING SIGNALING MESSAGES ASSOCIATED WITH DELIVERY OF STREAMING MEDIA CONTENT TO SUBSCRIBERS VIA A BROADCAST AND MULTICAST SERVICE (BCMCS)

(75) Inventors: Travis E. Russell, Clayton, NC (US); Peter J. Marsico, Chapel Hill, NC (US)

(73) Assignee: Tekelec, Morrisville, NC (US)

( * ) Notice: Subject to any disclaimer, the term of this patent is extended or adjusted under 35 U.S.C. 154(b) by 1411 days.

(21) Appl. No.: 11/440,797

(22) Filed: May 25, 2006

(65) Prior Publication Data

US 2007/0067794 A1    Mar. 22, 2007

Related U.S. Application Data

(60) Provisional application No. 60/714,060, filed on Sep. 2, 2005.

(51) Int. Cl.
  *H04J 3/08* (2006.01)
  *H04J 1/14* (2006.01)
  *H04J 3/12* (2006.01)
(52) U.S. Cl. ......... 370/236; 370/328; 370/496; 370/522
(58) Field of Classification Search .................. 370/235, 370/236, 328, 496, 522
See application file for complete search history.

(56) References Cited

U.S. PATENT DOCUMENTS

| | | | |
|---|---|---|---|
| 6,904,058 B2 | 6/2005 | He et al. | |
| 7,191,332 B1 | 3/2007 | Pankaiakshan et al. | |
| 7,388,855 B2 | 6/2008 | Madour | |
| 7,720,463 B2 | 5/2010 | Marsico et al. | |
| 7,860,799 B2 | 12/2010 | Russell et al. | |
| 2002/0141584 A1 | 10/2002 | Razdan et al. | |
| 2002/0184527 A1 | 12/2002 | Chun et al. | |
| 2003/0032409 A1 | 2/2003 | Hutcheson et al. | |
| 2003/0134622 A1 | 7/2003 | Hsu et al. | |
| 2003/0211843 A1 | 11/2003 | Song et al. | |
| 2004/0109558 A1 | 6/2004 | Koch | |
| 2004/0143497 A1 | 7/2004 | Hayashi et al. | |
| 2004/0167977 A1 | 8/2004 | Douglas et al. | |

(Continued)

FOREIGN PATENT DOCUMENTS

WO    WO 00/28773    5/2000

(Continued)

OTHER PUBLICATIONS

"Broadcast and Multicast Service in cdma2000 Wireless IP Network," $3^{rd}$ Generation Partnership Project 2, 3GPP2 X.S0022-0, Version 1.0, 98 pages (Dec. 2004).

(Continued)

*Primary Examiner* — Ronald Abelson

(74) *Attorney, Agent, or Firm* — Jenkins, Wilson, Taylor & Hunt, P.A.

(57) ABSTRACT

Methods, systems, and computer program products for analyzing signaling messages associated with delivery of streaming media content to subscribers via a broadcast and multicast service (BCMCS) are disclosed. According to one method, at least one signaling message transmitted between network elements associated with delivery of streaming media content to a subscriber via a BCMCS is monitored. The at least one signaling message is analyzed. Information resulting from the analysis is provided to at least one BCMCS data processing application.

49 Claims, 9 Drawing Sheets

U.S. PATENT DOCUMENTS

| | | | |
|---|---|---|---|
| 2004/0198371 | A1 | 10/2004 | Balasubramanian et al. |
| 2005/0015583 | A1 | 1/2005 | Sarkkinen et al. |
| 2005/0038707 | A1 | 2/2005 | Roever et al. |
| 2005/0047335 | A1 | 3/2005 | Cheng et al. |
| 2005/0071179 | A1 | 3/2005 | Peters et al. |
| 2005/0079869 | A1 | 4/2005 | Khalil et al. |
| 2005/0086683 | A1 | 4/2005 | Meyerson |
| 2005/0102397 | A1 | 5/2005 | Tsuyama et al. |
| 2005/0138379 | A1 | 6/2005 | Semple et al. |
| 2005/0282571 | A1* | 12/2005 | Oprescu-Surcobe et al. 455/503 |
| 2006/0161626 | A1 | 7/2006 | Cardina et al. |
| 2006/0165227 | A1 | 7/2006 | Steeb et al. |
| 2006/0179147 | A1 | 8/2006 | Tran et al. |
| 2006/0271488 | A1 | 11/2006 | Maes |
| 2007/0042757 | A1 | 2/2007 | Jung et al. |
| 2007/0049342 | A1 | 3/2007 | Mayer et al. |
| 2007/0050510 | A1 | 3/2007 | Jiang |
| 2007/0078714 | A1 | 4/2007 | Ott, IV et al. |
| 2007/0086380 | A1 | 4/2007 | Lim et al. |
| 2007/0086437 | A1 | 4/2007 | DiFazio et al. |
| 2007/0094142 | A1 | 4/2007 | Russell et al. |
| 2007/0094712 | A1 | 4/2007 | Gibbs et al. |
| 2007/0124784 | A1 | 5/2007 | Shon et al. |
| 2007/0124785 | A1 | 5/2007 | Marsico |
| 2007/0220106 | A1 | 9/2007 | Reisman |
| 2007/0275742 | A1 | 11/2007 | Zhang |
| 2008/0276304 | A1 | 11/2008 | Maffione et al. |
| 2009/0075635 | A1 | 3/2009 | Russell et al. |
| 2009/0147721 | A1 | 6/2009 | Shim et al. |
| 2009/0157697 | A1 | 6/2009 | Conway et al. |
| 2010/0330960 | A1 | 12/2010 | Ravishankar et al. |

FOREIGN PATENT DOCUMENTS

| | | | |
|---|---|---|---|
| WO | WO 02/15607 | A2 | 2/2002 |
| WO | WO 02/17612 | A2 | 2/2002 |
| WO | WO 03/107283 | A1 | 12/2003 |
| WO | WO 2005/041549 | A1 | 5/2005 |
| WO | WO 2007/027895 | A2 | 3/2007 |
| WO | WO 2007/030270 | A2 | 3/2007 |
| WO | WO 2007/050590 | A2 | 5/2007 |

OTHER PUBLICATIONS

Aboba et al., "RADIUS and IPv6," Network Working Group, www.ietf.org/rfc/rfc3162. txt, pp. 1-12 (Aug. 2001).

Rigney, "RADIUS Accounting," Network Working Group, www.ietf.org/rfc/rfc2866.txt, pp. 1-27 (Jun. 2000).

Rigney et al., "Remote Authentication Dial in User Service (RADIUS)," www.ieft.org/rfcrfc2865.txt, pp. 1-71 (Jun. 2000).

Commonly-assigned, co-pending U.S. Patent Application (Serial No. Not Yet Assigned) for "Methods, Systems, and Computer Program Products for Providing Third Party Control of Access to Media Content Available via Broadcast and Multicast Service (BCMCS)," (Unpublished, filed Aug. 17, 2006).

Chowdhury, et al., "Broadcast-Multicast Service Controller Discovery via DHCP-Option-Codes," txt draft-chowdhury-dhc-bcmcv4-option-00.txt, draft-chowdhury-dhc-bcmcv6-option-00.txt, pp. 1-10 (publication date unknown).

Harte, "10 Things You Need to Know About IP Television," www.IPTVMagazine.com, pp. 27-34 (Jul. 2005).

Lee, "3GPP2 Broadcast and Multicast Services BCMCS," KRnet2005, pp. 1-40, (Jun. 2005).

"Broadcast and Multicast Service in cdma2000® Wireless IP Network," TIA-1041 Ballot Version (Aug. 2004).

Wang et al., "Broadcast and Multicast Services in cdma2000," IEEE Communications Magazine, pp. 76-82 (Feb. 2004).

Calhoun et al., "Diameter Base Protocol," RFC Archive RFC 3588, Network Working Group, Ericsson, pp. 1-149, Ericsson (Sep. 2003).

Marcovici, "Joint Meeting 3GPP / 3GPP2," 3rd Generation Partnership Project 2, "3GPP2" S3-030450, pp. 1-25 (Jul. 16, 2003).

Rose et al., "BCMCS Security Framework," QUALCOMM S3-030451, pp. 1-24 (Jul. 16, 2003).

Kasargod et al., Packet data in the Ericsson CDMA2000 radio access network, Ericsson Review No. 3 (2002).

Chuah et al., Quality of Service in Third-Generation IP-Based Radio Access Networks, Bell Labs Technical Journal 7(2), pp. 67-89 (2002).

Fielding et al., "Hypertext Transfer Protocol—HTTP/1.1," Network Working Group, W3C/MIT, 114 pgs., Jun. 1999.

de Goyeneche, "Multicast over TCP/IP HOWTO," v1.0, pp. 1-30 (Mar. 20, 1998).

Semeria et al., "Introduction to IP Multicast Routing," draft-semeria-multicast-intro-00.txt, pp. 1-15 (May 1996).

Notification of Transmittal of the International Search Report and the Written Opinion of the International Searching Authority, or the Declaration for International Application No. PCT/US06/31471 (Apr. 24, 2007).

Notification of Transmittal of the International Search Report and the Written Opinion of the International Searching Authority, or the Declaration for International Application No. PCT/US06/34034 (Sep. 24, 2007).

Commonly-assigned, co-pending U.S. Appl. No. 12/276,251 for "Methods, Systems, and Computer Program Products for Providing Media Content Delivery Audit and Verification Services," (Unpublished, filed Nov. 21, 2008).

Restriction and/or Election Requirement for U.S. Appl. No. 11/413,064 (Oct. 31, 2008).

Communication of European Publication Number and Information on the Application of Article 67(3) EPC for European Patent No. 1949331 (Jul. 2, 2008).

Communication of European Publication Number and Information on the Application of Article 67(3) EPC for European Application No. 06801317.6 (May 28, 2008).

Notification of Transmittal of the International Search Report and the Written Opinion of the International Searching Authority, or the Declaration corresponding to PCT Application No. PCT/US06/41450 (Jan. 22, 2008).

Official Action for U.S. Appl. No. 11/413,064 (Dec. 23, 2008).

Interview Summary for U.S. Appl. No. 11/413,064 (Apr. 3, 2009).

Final Official Action for U.S. Appl. No. 11/413,064 (Jun. 25, 2009).

Official Action for U.S. Appl. No. 11/505,699 (Jun. 24, 2009).

Notice of Allowance and Fee(s) Due for U.S. Appl. No. 11/505,699 (Dec. 31, 2009).

Official Aciton for U.S. Appl. No. 12/276,251 (Dec. 9, 2009).

Interview Summary for U.S. Appl. No. 11/413,064 (Nov. 18, 2009).

Official Action for U.S. Appl. No. 11/413,064 (Oct. 23, 2009).

"Short Message Point to Point Protocol Specification V5.0," SMS Forum Standard, p. 1-166 (Feb. 19, 2003).

"3rd Generation Partnership Project; Technical Specification Group Core Network; Mobile Application Part (MAP) Specification," 3GPPP TS 09-02 V7.15.0, p. 1-875 (Release 1998).

Interview Summary for U.S. Appl. No. 11/413,064 (May 5, 2010).

Supplemental Notice of Allowability for U.S. Appl. No. 11/505,699 (Apr. 2, 2010).

Interview Summary for U.S. Appl. No. 12/276,251 (Mar. 11, 2010).

Interview Summary for U.S. Appl. No. 11/413,064 (Mar. 11, 2010).

Supplemental Notice of Allowability for U.S. Appl. No. 11/505,699 (Feb. 26, 2010).

Final Official Action for U.S. Appl. No. 11/413,064 (Feb. 2, 2010).

Official Action for U.S. Appl. No. 12/276,251 (Sep. 27, 2010).

Notice of Allowance and Fee(s) Due for U.S. Appl. No. 11/413,064 (Sep. 10, 2010).

Interview Summary for U.S. Appl. No. 12/276,251 (Aug. 27, 2010).

Interview Summary for U.S. Appl. No. 11/413,064 (Aug. 27, 2010).

Final Official Action for U.S. Appl. No. 12/276,251 (Jun. 9, 2010).

Final Official Action for U.S. Appl. No. 12/276,251 (Apr. 11, 2011).

Supplementary European Search Report for European Patent No. 1 949 331 (Mar. 18, 2011).

Interview Summary for U.S. Appl. No. 12/276,251 (Jan. 26, 2011).

* cited by examiner

METHODS, SYSTEMS, AND COMPUTER PROGRAM PRODUCTS FOR MONITORING AND ANALYZING SIGNALING MESSAGES ASSOCIATED WITH DELIVERY OF STREAMING MEDIA CONTENT TO SUBSCRIBERS VIA A BROADCAST AND MULTICAST SERVICE (BCMCS)

RELATED APPLICATIONS

This application claims the benefit of U.S. Provisional Patent Application Ser. No. 60/714,060, filed Sep. 2, 2005, the disclosure of which is hereby incorporated herein by reference in its entirety.

TECHNICAL FIELD

The subject matter described herein relates to methods and systems for monitoring aspects of streaming media content distribution in a wireless communications network. More particularly, the subject matter described herein relates to methods, systems, and computer program products for monitoring and analyzing signaling messages associated with delivery of streaming media content to subscribers via a broadcast and multicast service (BCMCS)

BACKGROUND ART

Broadcast and multicast service (BCMCS) supports the broadcasting and multicasting of video or other media content to mobile subscribers in cdma2000 networks. BCMCS specifications, including 3GPP2 X.S0022-0 *Broadcast and Multicast Service in cdma2000 Wireless IP Network*, Version 1.0 December 2004, the disclosure of which is incorporated herein by reference in its entirety, define signaling procedures associated with setup and teardown of facilities used to deliver streaming media content to wireless subscribers.

The above-referenced BCMCS standard discusses the use of one or more Authentication, Authorization, and Accounting (AAA) servers for the purposes of generating and maintaining BCMCS subscriber usage accounting information for access to streaming media content, such as Internet protocol television (IP TV), movies, or music, via a BCMCS. However, complete reliance on network AAA functions may present a number of problems for network operators that provide BCMCS service. For example, a subscriber's home AAA function may not receive all of the messages relating to delivery of BCMCS content. Hence, relying on the subscriber's home AAA function to accurately determine whether a user has received multimedia content may result in an incomplete picture of the content received by the subscriber. For example, the AAA function may receive messages indicating that media content is being requested, but may not receive messages associated with setting up the media channel with the requesting device.

In addition, a mobile subscriber's home AAA function may not be able to collect information in real time suitable for diagnostic purposes. Another problem associated with using a mobile subscriber's home AAA function to collect usage and accounting information for content delivered using a BCMCS is that the home AAA function may not have a complete picture of the information that is delivered to a subscriber when the subscriber is roaming. Still another problem associated with using a mobile subscriber's home AAA function to generate and maintain usage and accounting information for streaming media content delivered via a BCMCS is that it may be desirable to have a source independent from the home AAA function collect usage information for billing verification purposes.

BCMCS services are accessible by any authorized subscriber with a BCMCS-capable user terminal, where an authorized subscriber may include a child or adolescent. As such, using a BCMCS user terminal, a minor may choose to view BCMCS content, which is not considered suitable by his or her parent or guardian. There is presently no method or procedure defined in the BCMCS standards to address the issue of parental controls associated with BCMCS services, and there is no system for monitoring and reporting BCMCS content access/usage by such unsupervised minors.

Accordingly, there exists a need for improved methods, systems, and computer program products for collecting, analyzing, and reporting BCMCS usage information in a wireless communications network.

SUMMARY

The subject matter described herein includes methods, systems, and computer program products for monitoring and analyzing signaling messages associated with delivery of streaming media content to subscribers via a broadcast and multicast service (BCMCS). According to one method, at least one signaling message transmitted between network elements associated with delivery of streaming media content to a subscriber via a BCMCS is monitored. The at least one signaling message is analyzed. Data from the at least one signaling message is provided to at least one BCMCS data processing application.

According to another aspect, the subject matter described herein includes a method for collecting streaming media content access statistics for streaming media content accessed by subscribers via a broadcast and multicast service (BCMCS). The method includes monitoring a plurality of signaling messages transmitted to or from network elements that are associated with a delivery of streaming media content to subscribers via a BCMCS. Information that identifies streaming media content accessed by the mobile subscribers is derived from the signaling messages. Streaming media content access statistics are generated based on the identified content.

According to yet another aspect, the subject matter described herein includes a network data collection system for monitoring, analyzing, and reporting signaling information associated with streaming media content accessed by a subscriber via a broadcast and multicast service (BCMCS). The system includes a signaling message monitoring function, at least a portion of which is separate from a subscriber's home authentication, authorization, and accounting node, that monitors at least one signaling message transmitted between network elements that are associated with delivery of streaming media content to a subscriber via a BCMCS. A signaling message analyzer function analyzes the at least one signaling message and provides information from the analysis to at least one BCMCS data processing application.

The subject matter described herein providing BCMCS network monitoring and associated signaling message analysis may be implemented using a computer program product comprising computer executable instructions embodied in a computer readable medium. Exemplary computer readable media suitable for implementing the subject matter described herein include disk memory devices, programmable logic devices, application specific integrated circuits, and downloadable electrical signals. In addition, a computer readable medium that implements the subject matter described herein may be located on a single device or computing platform or may be distributed across multiple physical devices and/or computing platforms.

BRIEF DESCRIPTION OF THE DRAWINGS

Preferred embodiments of the subject matter described herein will now be explained with reference to the accompanying drawings of which.

DETAILED DESCRIPTION OF THE INVENTION

Figure 1:
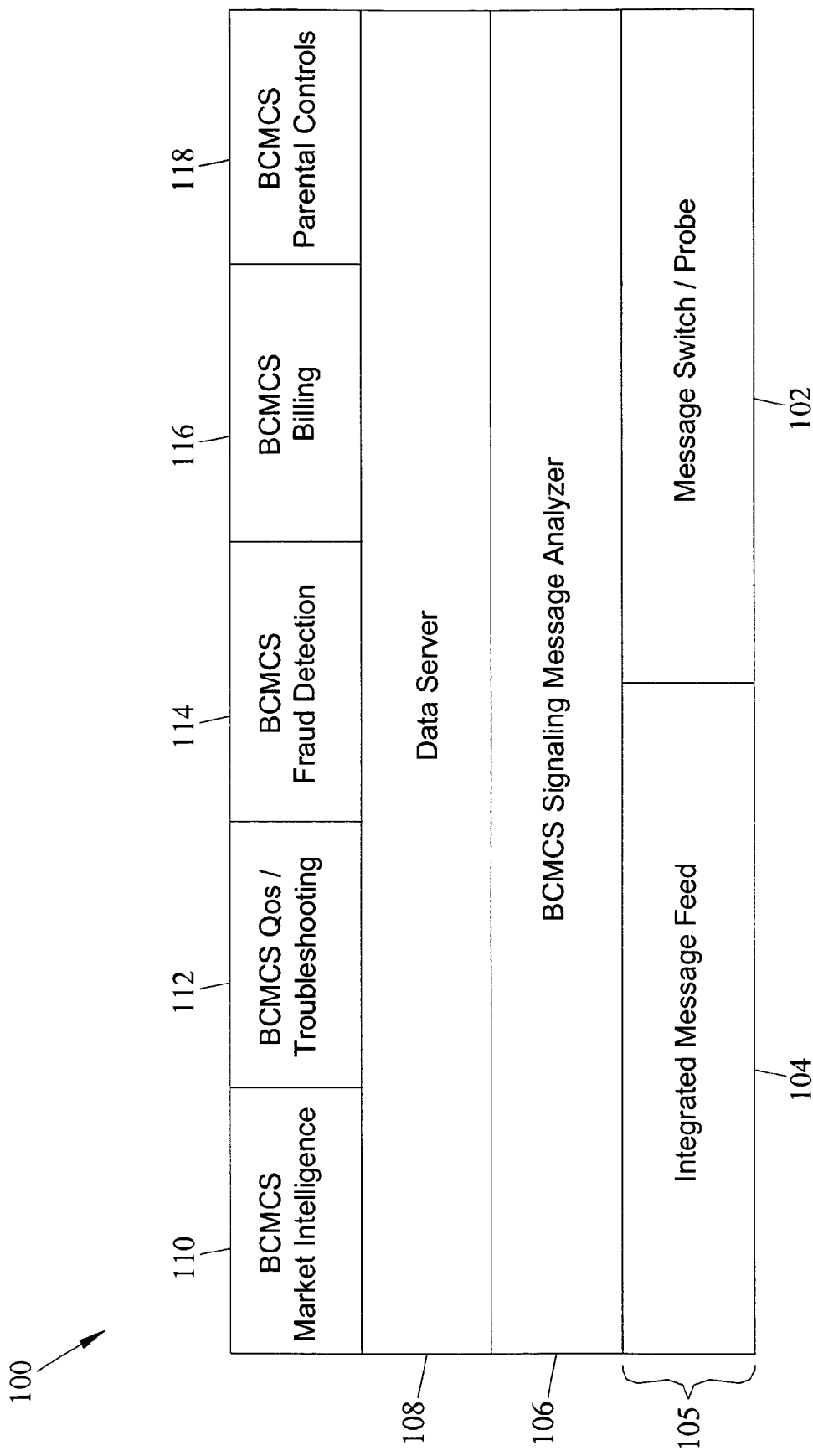
FIG. 1 is a block diagram illustrating an exemplary BCMCS monitoring, analysis and reporting system according to an embodiment of the subject matter described herein.

FIG. 1 is a block diagram illustrating an exemplary system 100 for monitoring, analyzing and reporting usage information associated with providing media content to mobile subscribers via a BCMCS. In FIG. 1, BCMCS monitoring system 100 is adapted to passively monitor signaling communication links, such as time division multiplexed (TDM) or packet links, using a message switch 102. Message switch 102 may be a passive probe that is used to collect data from a variety of interfaces, including T1/E1 and 10/100/1000 BASE-T Ethernet. Message switch 102 may provide frame capture, filtering, routing, and time-stamping, and comprehensive support for any number of communication protocols, including Internet protocol (IP), signaling system 7 (SS7) message transfer part (MTP), asynchronous transfer mode (ATM), transmission control protocol (TCP), user datagram protocol (UDP), and stream control transmission protocol (SCTP). BCMCS monitoring system 100 may also monitor BCMCS related signaling message traffic using an integrated message feed (IMF) function 104. IMF function 104 may reside on or be associated with any network element that sends, receives, or routes BCMCS-related signaling messages. IMF function 104 may reside within the host network element and serves as a local processor for copying and buffering and BCMCS-related signaling message traffic.

Message switch 102 and integrated message feed 104 may be generically referred to as a signaling message monitoring function 105 that monitors signaling messages transmitted to or from network elements associated with delivery of streaming media content to mobile subscribers via a BCMCS. For example, signaling message monitoring function 105 may copy messages associated with delivery of media content to a subscriber via a BCMCS using stand-alone signaling link probes or using signaling message copy functions internal to nodes associated with delivery of BCMCS content to a subscriber.

In the illustrated example, BCMCS monitoring system 100 includes a message analyzer function 106 that analyzes received BCMCS signaling messages or signaling message copies and provides information based on the analysis to at least one BCMCS data processing application via data server 108. For example, analyzer function 106 may receive copies of BCMCS signaling messages associated with a BCMCS transaction and produce a transaction detail record (TDR) that is representative of the observed BCMCS transaction. Protocols supported by and analyzed analyzer function 106 include session initiation protocol (SIP), session description protocol (SDP), signaling connection control part (SCCP), SCCP user adaptation layer (SUA), transaction capabilities application part (TCAP), mobile application part (MAP), hypertext transfer protocol (HTTP), RADIUS, and DIAMETER. For example, analyzer function 106 may receive and correlate HTTP messages associated with a BCMCS InformationAcquisitionRequest/InformationAcquisitionResponse transaction initiated by a BCMCS mobile subscriber. These messages may be correlated, and some or all of the information contained in the messages may be used to produce a TDR that is representative of the transaction.

Correlated BCMCS signaling message information, such as TDRs that include data collected from multiple signaling messages relating to the same BCMCS media content delivery transaction, may be stored by data server function 108. Data server function 108 may provide the correlated BCMCS signaling information to BCMCS data processing applications. BCMCS data processing applications may reside on a processing platform associated with the BCMCS monitoring system, or such applications may reside on remotely located processing platforms which are connected to the BCMCS monitoring system via a communication link. Exemplary BCMCS data processing applications include BCMCS market intelligence application 110, BCMCS troubleshooting application 112, BCMCS fraud detection application 114, BCMCS billing application 116, and BCMCS parental control application 118. Each of these applications will be described in more detail below.

Exemplary BCMCS Network Architecture

Figure 2:
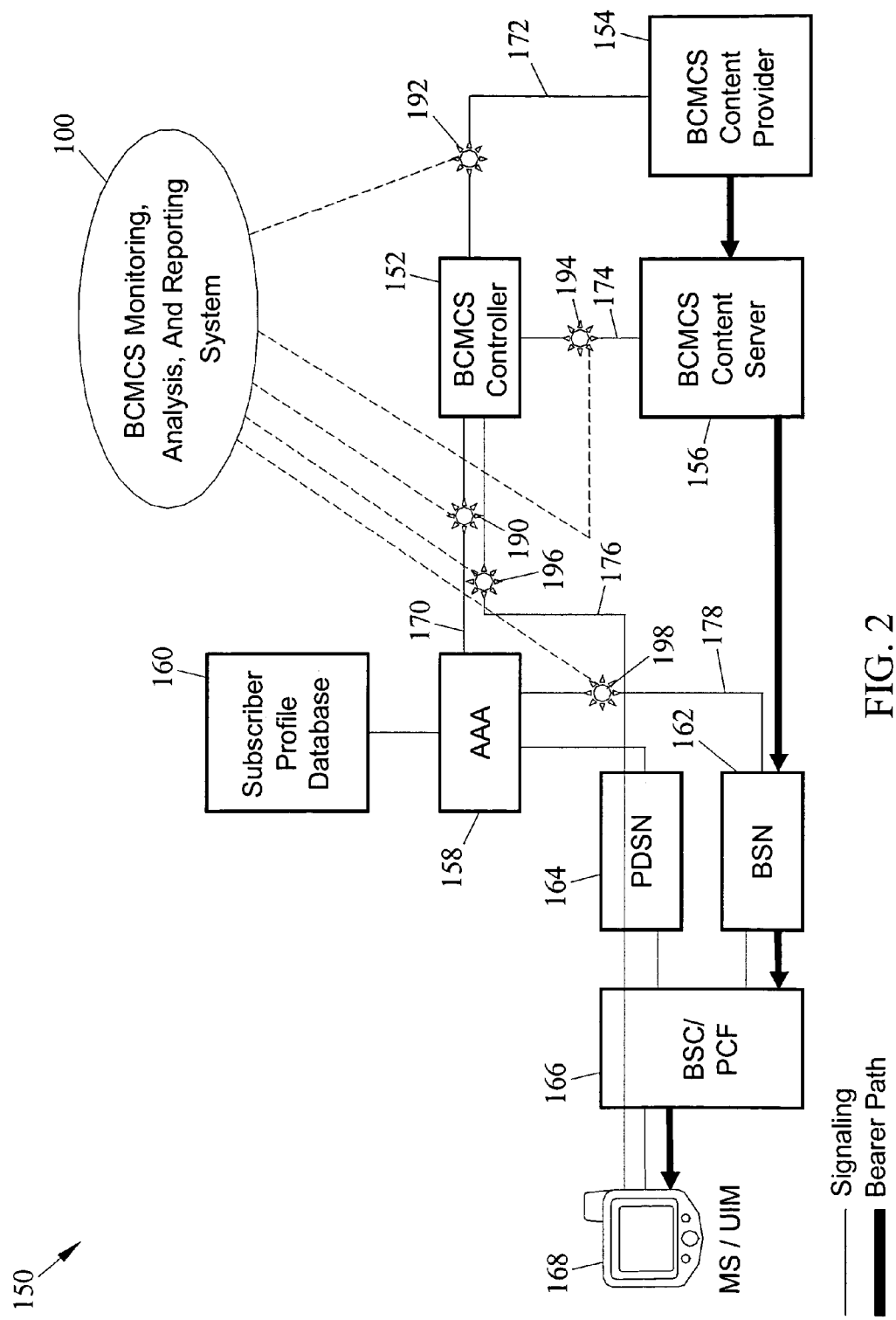
FIG. 2 is a network diagram illustrating an exemplary BCMCS monitoring, analysis and reporting system for collecting BCMCS-related signaling information using signaling link probes according to an embodiment of the subject matter described herein.

FIG. 2 illustrates an exemplary implementation of BCMCS monitoring, analysis and reporting system 100 in a BCMCS network environment 150 according to an embodiment of the subject matter described herein. In FIG. 2, BCMCS network 150 includes a BCMCS controller 152, a BCMCS content provider 154, a BCMCS content server 156, an authentication, authorization, and accounting (AAA) function 158, a BCMCS subscriber profile database 160, a broadcast serving node (BSN) 162, a packet data serving node (PDSN) 164, a base station controller (BSC)/packet control function (PCF) 166, and a mobile BCMCS subscriber (MS) 168.

BCMCS controller 152 manages and provides BCMCS session information to BSN 162, BCMCS content server 156, and mobile subscriber 168. BCMCS controller 152 communicates BCMCS session information to BSN 162 via interface 170. The BCMCS session information may include IP multicast flow treatment information, QoS information, BCMCS flow identifier to multicast IP address and port mapping information. Communications between BCMCS controller 152 and BSN 162 may involve AAA function 158 and may utilize RADIUS, DIAMETER or other suitable protocols. A detailed description of the RADIUS protocol can be found in Internet Engineering Task Force (IETF) RFC 3162 *RADIUS and IPv6*, August 2001, RFC 2865 *Remote Authentication Dial In User Service (RADIUS)*, June 2000, and RFC 2866 *RADIUS Accounting*, June 2000, the disclosures of which are incorporated herein by reference in their entirety. A detailed description of the DIAMETER protocol can be found in IETF RFC 3588 *Diameter Base Protocol*, September 2003, the disclosure of which is incorporated herein by reference in its entirety.

BCMCS controller 152 may communicate with BCMCS content provider 154 via interface 172 to obtain and/or provide content provider identification information, program identification information, session description information (e.g., media format, codec type, etc.), security information, and other BCMCS service related information. Any number of protocols may be used to facilitate the communication of such information on the BCMCS controller to BCMCS content provider interface including proprietary protocols, and non-proprietary protocols, such as IP/TCP/HTTP/XML.

BCMCS content provider 154 is the creator or source of the media content, while BCMCS content server 156 provides BCMCS content to mobile subscriber 168 using a IP multicast stream. BCMCS content server 156 may store and forward media content provided by the BCMCS content provider 154 and consolidate or merge media content provided by multiple content providers in the network. BCMCS controller 152 may communicate with BCMCS content server 156 via interface 174 to obtain and/or provide security information, multicast IP address and port information, and BCMCS content management information (e.g., BCMCS session start time, session duration, etc.). Any number of protocols may be used to facilitate the communication of such information on the BCMCS controller to BCMCS content server interface including proprietary protocols and non-proprietary protocols, such as IP/TCP/HTTP/XML.

AAA function 158 may provide BCMCS-related authentication and authorization of BCMCS subscribers. AAA function 158 may also provide BCMCS-related accounting functions. In order to provide such services, AAA function 158 may access BCMCS subscriber profile database 160 to obtain BCMCS subscriber specific information. AAA function 158 may communicate with other BCMCS network elements using protocols such as RADIUS, DIAMETER or other suitable protocols. BCMCS controller 152 may communicate with AAA function 158 to obtain authentication and authorization information for a BCMCS subscriber. BCMCS controller 152 may provide accounting information associated with a BCMCS subscriber to AAA function 158. As described above, BCMCS controller to AAA function interface 170 may also be used to relay BCMCS session information between BCMCS controller 152 and BSN 162.

Certain BCMCS networking scenarios may include multiple AAA functions, such as a serving AAA function and a home AAA function. For purposes of illustration, a single AAA function 158 is described herein. If multiple AAA functions are involved in a BCMCS transaction, monitoring system 100 may be extended to monitor, analyze and report information that is communicated between the multiple AAA functions.

BCMCS controller 152 may communicate with a BCMCS client application associated with subscriber 168 via interface 176 to provide BCMCS-related session information including program identification information, BCMCS flow identification information, broadcast access key (BAK) information, BCMCS session start time information, BCMCS session duration information, BCMCS session description information (e.g., media format, codec type, etc.), and BCMCS flow treatment. Protocols used on BCMCS controller MS interface 176 may include IP/TCP/HTTP/XML.

BSN 162 communicates with BSC/PCF function 166 via interface 178 to manage IP multicast flows and to facilitate BCMCS accounting based on octet counts. PDSN 164 may communicate with MS 168 using unicast packet data service. BCMCS mobile subscriber 168 may perform BCMCS information acquisition and BCMCS registration, and receive BCMCS-related IP multicast flows from content server 156.

As illustrated in FIG. 2, BCMCS monitoring, analysis, and reporting system 100 may monitor BCMCS-related signaling message traffic associated with interfaces 170, 172, 174, 176 and 178 using monitoring probes 190, 192, 194, 196 and 198, respectively. Monitoring on each of these interfaces will now be described in detail.

Exemplary BCMCS Controller MS Interface Monitoring

MS 168 may acquire BCMCS content and scheduling information via a number of different mechanisms, as described in the above-referenced BCMCS standard. BCMCS content and scheduling information discovery mechanisms include client-server applications, messaging service applications (e.g., short message service), and wireless application protocol (WAP)-based applications. Via these or other mechanisms, MS 168 requests and/or receives BCMCS programming information, which may include program name and scheduling information. For example, a BCMCS client application residing on a mobile subscriber terminal may contact a BCMCS server application residing at the BCMCS controller 152 and request BCMCS programming content information. Such BCMCS content discovery transactions may be performed using XML/HTTP/TCP/IP, and messages associated with these transactions may be monitored on interface 176 by monitoring system 100. Information associated with BCMCS content discovery transactions may be stored in one or more TDR records.

Figure 3:
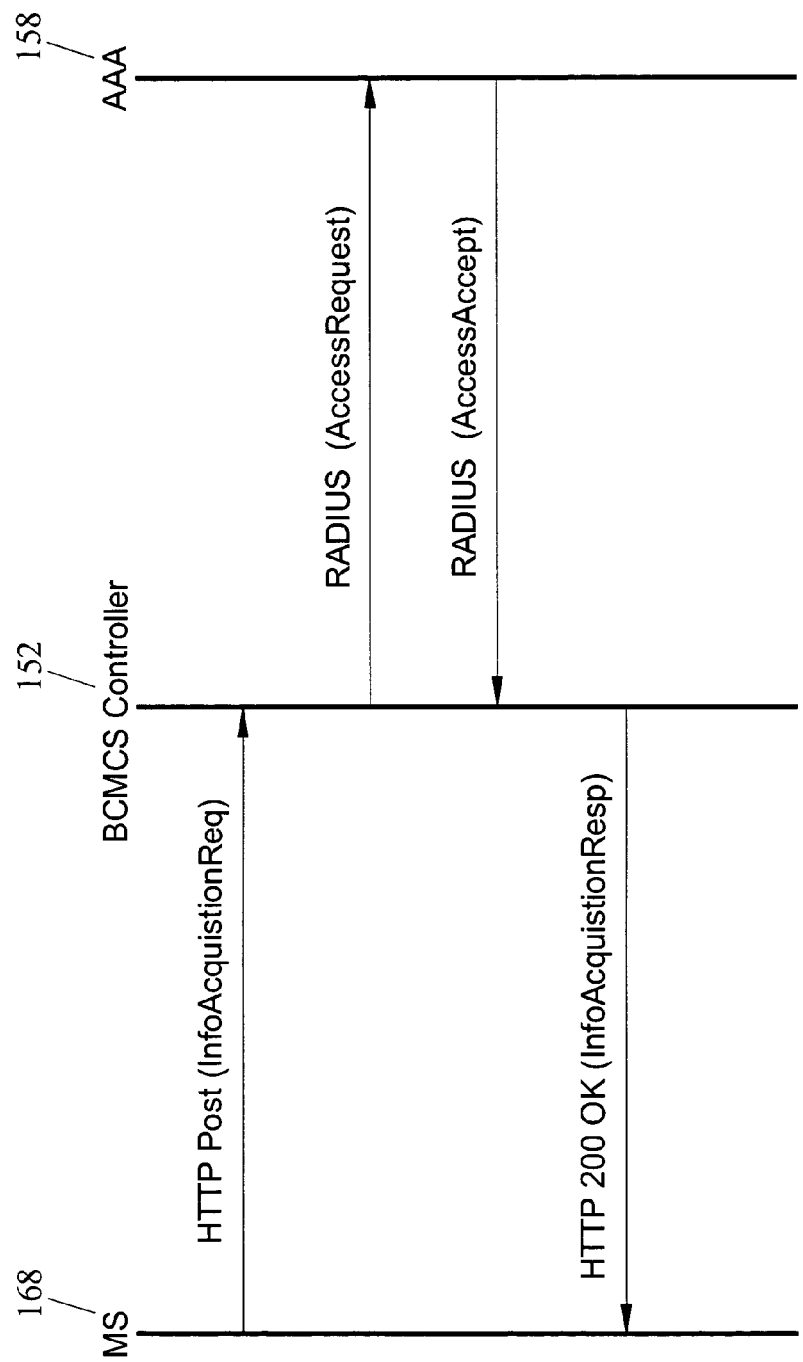
FIG. 3 is a message flow diagram illustrating an exemplary BCMCS InformationAcquisitionRequest transaction and an associated RADIUS AccessRequest transaction in a BCMCS network.

MS 168 may select a particular BCMCS program for viewing, and as such, may communicate with BCMCS controller 152 via interface 176 to request the selected program. FIG. 3 illustrate exemplary messaging associated with a BCMCS transaction. As illustrated in FIG. 3, MS 168 may transmit a BCMCS InformationAcquisitionRequest message to BCMCS controller 152. The message may be an XML-formatted message transmitted using HTTP and TCP/IP. An exemplary, XML-encoded BCMCS InformationAcquisitionRequest message is illustrated below. In this example, MS 168 requests "All" BCMCS information, including BAK information, associated with a BCMCS program called "Tekelec Q305 Earnings".

```
<?xml version="1.0" encoding="UTF-8"?>
<BCMCS Ver="1.0"
xmlns="http://www.3gpp2.org/XMLSchema"
xmlns:xsi="http://www.w3.org/2001/XMLSchema-instance">
    <Request>
        <NAI>MS168@Tekelec.com</NAI>
        <PgmInfo>
            <RequestType>
               <RequestTypeVal>All</RequestTypeVal>
            </RequestType>
            <BAKReq>CurrentBAK</BAKReq>
            <ReqInfo>
               <PgmName>Tekelec Q305 Earnings</PgmName>
            </ReqInfo>
        </PgmInfo>
        <TimeStamp>4294967295</TimeStamp>
        <ReqSysInfo>
            <SystemInfo>
               <SID>65535</SID>
               <NID>65535</NID>
               <PZID>65535</PZID>
            </SystemInfo>
        </ReqSysInfo>
    </Request>
</BCMCS>
```

An associated, XML-encoded, BCMCS InformationAcquisitionResponse message, provided by BCMCS controller 152, is illustrated below.

```
<?xml version="1.0" encoding="UTF-8"?>
<BCMCS Ver="1.0" xmlns="http://www.3gpp2.org/XMLSchema"
xmlns:xsi="http://www.w3.org/2001/XMLSchema-instance">
<Response>
    <BCMCSInfo>
        <PgmInfo>
            <FlowIDInfo>
               <FlowID>2005</FlowID>
               <IPPort>
                  <IPAddress>
                     <IPv4>224.2.1.1</IPv4>
                  </IPAddress>
                  <Port>49170</Port>
               </IPPort>
            </FlowIDInfo>
            <FlowIDInfo>
               <FlowID>2006</FlowID>
               <IPPort>
                  <IPAddress>
                     <IPv4>224.2.1.1</IPv4>
                  </IPAddress>
                  <Port>51372</Port>
               </IPPort>
            </FlowIDInfo>
            <AppInfo>
               <SDP>
               v=0
               o=alice 2890844526 2890844526 IN IP4
host.atlanta.example.com
                  s= Tekelec Q305 Earnings
                  c=IN IP4 224.2.1.1
                  t=2873397496 2873404696
                  m=audio 49170 RTP/AVP 8
                  a=rtpmap:8 PCMA/8000
                  m=video 51372 RTP/AVP 31
                  a=rtpmap:31 H261/90000
               </SDP>
            </AppInfo>
            <LinkInfo>
               <EncType>UpperLayer</EncType>
            </LinkInfo>
            <SecInfo>
               <TK_RAND>12297829382473034410</TK_RAND>
               <SecFlowInfo>
                  <FlowID>2005</FlowID>
                  <BAK_ID>2</BAK_ID>
                  <EncrBAK>3229782938247303441198</EncrBAK>
                  <BAKExpTime>2004-05-31T13:20:00-05:00</BAKExpTime>
                  <AuthReq>true</AuthReq>
               </SecFlowInfo>
               <SecFlowInfo>
                  <FlowID>2006</FlowID>
                  <BAK_ID>3</BAK_ID>
                  <EncrBAK>3229782938247303443123</EncrBAK>
                  <BAKExpTime>2004-05-31T13:20:00-05:00</BAKExpTime>
                  <AuthReq>true</AuthReq>
               </SecFlowInfo>
            </SecInfo>
        </PgmInfo>
    </BCMCSInfo>
</Response>
</BCMCS>
```

Probe 196 may observe the InformationAcquisitionRequest and Response messages that are communicated via interface 176 and to generate copies of these messages. The message copies are provided to BCMCS message analyzer 106 (FIG. 1), where the messages are correlated, and an associated TDR record is created. Such a TDR may include some or all of the information presented above in the sample InformationAcquisitionRequest and InformationAcquisitionResponse messages. In one example, the TDR may contain MS identifying information (e.g., Network Access Identifier), requested BCMCS program identification information (e.g., PgmName), an information request type indicator (e.g., RequestTypeVal), requested timestamp information (e.g., TimeStamp), system identification information (e.g., SID), network identification information (e.g., NID), packet zone identification information (e.g., PZID), and subnet identification information (e.g., SubnetID). The TDR record may be stored in data server 108 and may be made accessible to BCMCS data processing applications.

Exemplary BCMCS Controller—AAA Interface Monitoring

In response to receiving an InformationAcquisitionRequest message from a mobile subscriber, BCMCS controller 152 may perform authentication so as to avoid providing BCMCS program access information (e.g., broadcast access keys, etc.) based a request received from an invalid user. RADIUS signaling messages, such as RADIUS AccessRequest and AccessAccept messages, may be used to perform BCMCS subscriber authentication, as illustrated in FIG. 3. These RADIUS messages may be communicated between BCMCS controller 152 and AAA function 158 over interface 170 using UDP/IP.

Exemplary RADIUS AccessRequest and AccessAccept message parameters are shown below in Table 1. In Table 1, those parameter marked with an "M" are defined in the above-referenced BCMCS standard as being mandatory, while those marked with an "O" are considered optional.

TABLE 1

Exemplary RADIUS AccessRequest/Accept Parameters

| Parameter Name | AccessRequest | AccessAccept |
|---|---|---|
| User-Name | M | M |
| NAS-IP-Address | O | |
| NAS-IPv6-Address | O | |
| Correlation ID | M | |
| Acq Info TimeStamp | M | |
| Digest-Response | M | O |
| Digest-Realm | M | O |
| Digest-Nonce | M | O |
| Digest-Method | M | |
| Digest-URI | M | |
| Digest-QoP | M | O |
| Digest-Algorithm | M | O |
| Digest-Body | M | |
| Digest-CNonce | M | |
| Digest-Nonce-Count | M | |
| Digest-User-Name | M | |
| Digest-Opaque | O | O |
| Digest-Domain | | O |
| Digest-Stale | | O |
| Digest-Auth-Param | O | O |
| Auth-Key | | O |
| TK Info | | O |
| Class | | O |
| Program Name | O | O |
| Message-Authenticator | M | M |

By monitoring interface 170 using monitoring probe 190, BCMCS monitoring system 100 can generate a TDR record that includes information extracted from an observed RADIUS AccessRequest/Accept transaction. Such a TDR may include some or all of the information presented above in Table 1. In one example, a TDR may include MS identifying information (e.g., user-name), requested BCMCS program identification information (e.g., program name), requested timestamp information (e.g., Acq Info TimeStamp), and a message correlation identifier (e.g., correlation ID).

BCMCS controller 152 may be configured to create a TDR once a broadcast access key has been provided to a BCMCS subscriber. The TDR is transmitted to AAA function 158 via a RADIUS AccountingRequest message. The information provided by the BCMCS controller in the TDR may be used for accounting purposes. Exemplary information contained in a BCMCS controller-generated TDR is shown below in Table 2.

TABLE 2

Exemplary BCMCS Controller/BAK Accounting TDR Parameters

| Parameter | Description |
|---|---|
| Source IP Address | IPv4 address of the MS. |
| Network Access Identifier (NAI) | user@domain construct which identifies the user and home network of the MS. |
| Framed-IPv6-Prefix | MS IPv6 prefix. |
| IPv6 Interface ID | MS IPv6 interface identifier. |
| Account Session ID | The Account Session ID is a unique accounting ID created by the BCMCS Controller. |
| Correlation ID | The Correlation ID is a unique accounting ID created by the BCMCS Controller for each BAK distribution that allows accounting event to correlate with content information acqusition authentication and authorization. |
| BCMCS_FLOW_ID | Identities of the BCMCS Flow for which this Usage Data Record is generated. |
| Multicast IP Address | The Multicast IP address for a BCMCS flow. |
| Port | The port number for a BCMCS flow. |
| Class | This contains a string used by AAA |
| BCMCS Controller's IP Address | The IPv4 address of the RADIUS client in the BCMCS Controller |
| BCMCS Controller's IPv6 Address | The IPv6 address of the RADIUS client in the BCMCS Controller |
| Event Time | This is an event timestamp which indicates the time that the BAK is sent to the MS. |
| BAK_ID | BAK Identifier. |

By monitoring interface 170 using monitoring probe 190, BCMCS monitoring system 100 may generate TDR record, which contains BCMCS UDR information and/or information extracted from an observed RADIUS AccountingRequest transaction. Such a TDR may include some or all of the information presented above in Table 2. In one example, a TDR may contain MS identifying information (e.g., source IP address, network access identifier), requested BCMCS program identification information (e.g., BCMCS_FLOW_ID, multicast IP address, port), request timestamp information (e.g., event time), and a message correlation identifier (e.g., correlation ID). The message correlation ID information may be used to associate or link multiple TDR records that are related to the same BCMCS subscriber transaction.

Exemplary BCMCS Controller—BCMCS Content Provider Interface Monitoring

BCMCS controller 152 is adapted to communicate with BCMCS content provider 154 to exchange information including, but not limited to, media content provider identification information, BCMCS program identification information, BCMCS session description information (e.g., media type, codec type, etc.), and security information. This information may be exchanged using any suite of communication protocols that is suitable for the task, including but not limited to, a protocol suite comprising XML/HTTP/TCP/IP. An exemplary, XML encoded, BCMCS controller—BCMCS content provider information exchange message is presented below.

```
<?xml version="1.0" encoding="UTF-8"?>
<BCMCS Ver="1.0" xmlns="http://www.3gpp2.org/XMLSchema"
xmlns:xsi="http://www.w3.org/2001/XMLSchema-instance">
    <Response>
      <BCMCSInfo>
        <ContentProviderID>MoviesOnDemand<ContentProviderID>
        <PgmInfo>
          <PgmName>Tekelec Q305 Earnings</PgmName>
          <PgmStartTime>12/21/2005-09:32:00</ PgmStartTime >
          <PgmDuration>01:12:43</ PgmDuration >
          <AppInfo>
            <SDP>
            v=0
            o=alice 2890844526 2890844526 IN IP4
host.atlanta.example.com
              s= Tekelec Q305 Earnings
              c=IN IP4 224.2.1.1
              t=2873397496 2873404696
              m=audio 49170 RTP/AVP 8
              a=rtpmap:8 PCMA/8000
              m=video 51372 RTP/AVP 31
              a=rtpmap:31 H261/90000
            </SDP>
          </AppInfo>
          <SecInfo>
            <TK_RAND>12297829382473034410</TK_RAND>
          </SecInfo>
        </PgmInfo>
      </BCMCSInfo>
    </Response>
</BCMCS>
```

By monitoring interface 172 using monitoring probe 192, BCMCS monitoring system 100 is adapted to generate a TDR record, which contains information extracted from an observed BCMCS controller—BCMCS content provider information exchange transaction. Such a TDR may include some or all of the information presented above in the exemplary XML-formatted information exchange message. In one example, a TDR may contain BCMCS content provider identification information (e.g., ContentProviderID), BCMCS program identification information (e.g., PgmName), program start date/time information (e.g., PgmStartTime), and program duration information (e.g., PgmDuration).

Exemplary BCMCS Controller—BCMCS Content Server Interface Monitoring

BCMCS controller 152 is adapted to communicate with BCMCS content server 156 to exchange information including, but not limited to, BCMCS security information, IP multicast address and port identification information, and BCMCS program start time and duration information. This information may be exchanged using any suite of communication protocols that is suitable for the task, including a protocol suite comprising XML/HTTP/TCP/IP. An exemplary, XML encoded, BCMCS controller—BCMCS content server information exchange message is presented below.

```
<?xml version="1.0" encoding="UTF-8"?>
<BCMCS Ver="1.0" xmlns="http://www.3gpp2.org/XMLSchema"
xmlns:xsi="http://www.w3.org/2001/XMLSchema-instance">
    <Response>
      <BCMCSInfo>
        <PgmInfo>
          <PgmName>Tekelec Q305 Earnings</PgmName>
          <PgmStartTime>12/21/2005-09:32:00</ PgmStartTime >
          <PgmDuration>01:12:43</ PgmDuration >
          <FlowIDInfo>
            <FlowID>2005</FlowID>
            <IPPort>
              <IPAddress>
                <IPv4>224.2.1.1</IPv4>
              </IPAddress>
              <Port>49170</Port>
            </IPPort>
          </FlowIDInfo>
          <FlowIDInfo>
            <FlowID>2006</FlowID>
            <IPPort>
              <IPAddress>
                <IPv4>224.2.1.1</IPv4>
              </IPAddress>
              <Port>51372</Port>
            </IPPort>
          </FlowIDInfo>
          <AppInfo>
            <SDP>
            v=0
            o=alice 2890844526 2890844526 IN IP4
host.atlanta.example.com
              s= Tekelec Q305 Earnings
              c=IN IP4 224.2.1.1
              t=2873397496 2873404696
              m=audio 49170 RTP/AVP 8
              a=rtpmap:8 PCMA/8000
              m=video 51372 RTP/AVP 31
              a=rtpmap:31 H261/90000
            </SDP>
          </AppInfo>
          <SecInfo>
            <TK_RAND>12297829382473034410</TK_RAND>
          </SecInfo>
        </PgmInfo>
      </BCMCSInfo>
    </Response>
</BCMCS>
```

By monitoring interface 174 using monitoring probe 194, BCMCS monitoring system 100 may generate a TDR record including information extracted from an observed BCMCS controller—BCMCS content server information exchange transaction. Such a TDR may include some or all of the information presented above in the exemplary XML-formatted information exchange message. In one example, a TDR may contain IP multicast address and port information (e.g., IP Address, Port), BCMCS program identification information (e.g., PgmName), program start date/time information (e.g., PgmStartTime), and program duration information (e.g., PgmDuration).

Exemplary BSN—AAA Interface Monitoring

A BCMCS network operator may choose to implement octet-based accounting for BCMCS services that are provided to subscribers. In this case, BSN 162 may merge airlink service records and IP network specific service records to form one or more BCMCS usage data records (UDRs). A detailed description of octet-based BCMCS accounting is provided in the above-referenced BCMCS standard document.

Airlink service records may include an R-P connection setup airlink record, a BCMCS active start airlink record, and a BCMCS active stop airlink record. Information contained in airlink service records may include Radio Access Network (RAN)-to-PDSN (R-P) connection identification information, packet control function (PCF) address information, and BCMCS flow identification information.

BSN 152 may be configured to create a UDR upon the initial establishment of an R-P connection associated with a BCMCS subscriber. When the R-P connection is disconnected, BSN 152 may close the UDR and send accounting information to AAA function 158. BSN UDR information may be transmitted to AAA function 158 via a RADIUS AccountingRequest message. The UDR information provided by the BSN may be copied by a monitoring system according to the present subject matter and used for BCMCS accounting purposes. Exemplary information contained in a BSN-generated UDR is shown below in Table 3.

(e.g., Network Access Identifier), requested BCMCS program identification information (e.g., BCMCS_FLOW_ID, Multicast IP Address, Port), request timestamp information (e.g., Event Time, BCMCS Transmission Time), and a message correlation identifier (e.g., Correlation ID). The message correlation ID information may be used to associate or link multiple TDR records that are related to the same BCMCS subscriber transaction.

In the event that additional information of interest to a BCMCS network operator is communicated between PDSN 164 and AAA function 158, monitoring system 100 may observe and analyze messages and information communicated across the PDSN to AAA interface in a manner similar to that described above with respect the BSN to AAA interface 178.

By analyzing signaling messages and TDRs that contain information associated with media connections established with a requesting device, monitoring system 100 obtains more information than that obtained by a subscriber's home AAA function. Monitoring system 100 may use this information to make a determination as to whether media content is actually delivered to a subscriber. For example, if messaging

TABLE 3

Exemplary BSN/Octet Accounting UDR Parameters

| Parameter | Description |
| --- | --- |
| Network Access Identifier (NAI) | The group name (e.g., BCMCS@domain). |
| Account Session ID | The Account Session ID is a unique accounting ID created by the Serving BSN that allows start and stop RADIUS records from a single R-P connection to be matched. |
| Correlation ID | The Correlation ID is a unique accounting ID created by the BSN for each BCMCS session that allows multiple accounting events for each associated R-P connection to be correlated. |
| Session Continue | This attribute when set to 'true' means it is not the end of a Session and an Accounting Stop is immediately followed by an Account Start Record. If the value is set to 'False' or if the VSA is absent, it indicates the end of a session. |
| BCMCS_FLOW_ID | Identities of the BCMCS Flow for which this Usage Data Record is generated. |
| Multicast IP Address | The Multicast IP address for a BCMCS flow. |
| Port | The port number for a BCMCS flow. |
| BSN Address | The IPv4 address of the RADIUS client in the BSN. |
| Serving PCF | The IP address of the serving PCF, i.e., the PCF in the serving RN. |
| BSID | SID + NID + Cell Identifier type 2. |
| IPv6 BSN Address | The IPv6 address of the BSN. |
| Subnet | The subnet information for HRPD. |
| Data Octet Count | The total number of octets in IP packtes sent to the RN, as received at the BSN from the MR or the BCMCS content server. |
| Event Time | This is an event timestamp which indicates one of the following: The start of an accounting session if it is part of a RADIUS start message. The end of an accounting session if it is part of a RADIUS stop message. An Interim-Update accounting event if it is part of a RADIUS Interim-Update message. |
| BCMCS Transmission Time | The total BCMCS flow transmission time in seconds. |
| Container | 3GPP2 Accounting Container attribute. This attribute is used to embed 3GPP2 AVPs. |

By monitoring interface 178 using monitoring probe 198, BCMCS monitoring system 100 may generate a TDR record, which contains BSN UDR information and/or information extracted from an observed RADIUS AccountingRequest messaging transaction. Such a TDR may include some or all of the information presented above in Table 3. In one example, a TDR may contain MS identifying information relating to successful establishment of an R-P connection is present, then monitoring system 100 may determine that the media content has been delivered. In contrast, using only information collected or maintained by a subscriber's home AAA function, media content requests can be identified, but the AAA messaging may not indicate whether the media content is actually delivered.

Figure 4:
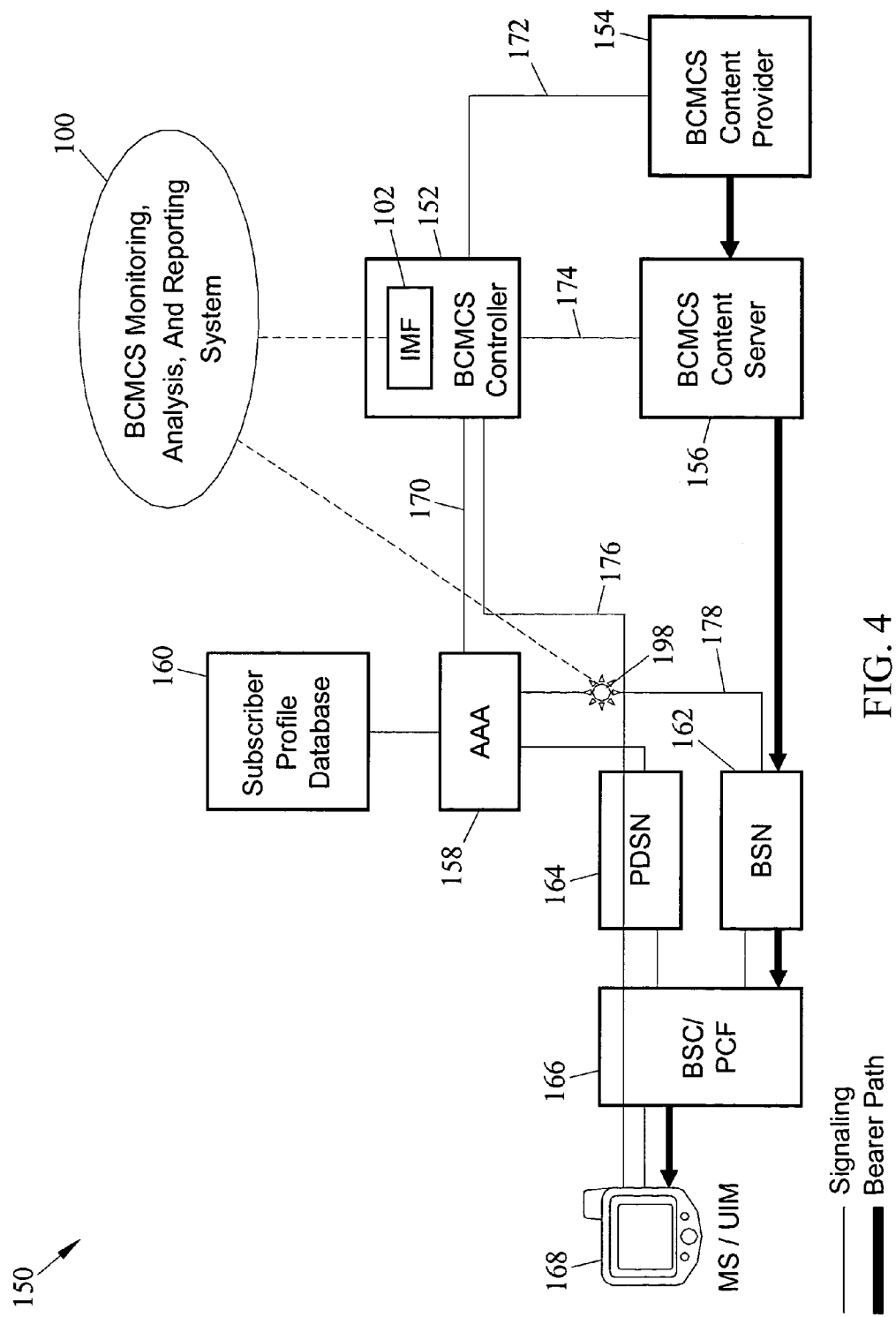
FIG. 4 is a network diagram illustrating an exemplary BCMCS monitoring, analysis and reporting system for collecting BCMCS-related signaling information using an integrated signaling message feed associated with a BCMCS network element according to an embodiment of the subject matter described herein.

FIG. 4 illustrates an alternate embodiment of the subject matter described herein that includes an integrated message feed (IMF) function 102 in BCMCS network 150. In this example, IMF function 102 is co-located with BCMCS controller 152. As such, IMF function 102 is adapted to observe and generate copies of messages that are sent to and from BCMCS controller 152. The copied messages may include the BCMCS InformationAcquisitonRequest, InformationAcquisitonResponse, RADIUS AccessRequest, AccessAccept, and RADIUS AccoutingRequest messages that were described above with respect to the probe-based embodiment. The message copies are correlated, stored and may be accessed by BCMCS applications, in a manner similar to that previously described. Multiple IMF functions may be incorporated within different BCMCS network elements, such as a BCMCS controller, a BCMCS content server, a AAA server, and a BSN node. IMF functions may also be deployed in tandem with external monitoring probes, such as is illustrated in FIG. 4 to provide the required monitoring scope in a BCMCS network.

BCMCS Data Processing Applications

Returning to FIG. 1, exemplary BCMCS applications associated with system 100 include a BCMCS market intelligence application 110, a BCMCS quality of service (QoS)/troubleshooting application 112, a fraud management application 114, a BCMCS billing application 116, and a BCMCS parental controls application 118. These applications are adapted to access and process the monitored BCMCS network signaling information (e.g., BCMCS TDR records) maintained by data server function 108.

BCMCS Market Intelligence Application

According to one aspect of the subject matter described herein, BCMCS marketing intelligence application 110 is adapted to access BCMCS related TDR records that are associated with the acquisition of BCMCS programming content and schedule information. TDR records that are accessed and analyzed may include information obtained from one or more service discovery and announcement messaging transactions. Such TDR records may include BCMCS program name information, program start time information, BCMCS content provider identification information, etc. Using this information, BCMCS marketing intelligence application 110 may calculate and report any number of BCMCS service related usage statistics. For example, application 110 may examine relevant TDR records and calculate the number of BCMCS programming content and scheduling information queries sent by mobile subscribers to BCMCS controller 152 in a given period of time. Application 110 may further calculate the number of program schedule information requests for a particular BCMCS program within a given period of time. Such statistics would not necessarily reflect the viewing habits of mobile subscribers, but rather the requests made by mobile subscribers for scheduling information associated with BCMCS programming content.

According to another aspect of the subject matter described herein, BCMCS marketing intelligence application 110 may access BCMCS TDR records that are associated with the distribution of BAK keys to BCMCS subscribers. Such TDR records may be information extracted from BCMCS InformationAcquisitionRequest/Response transactions, and/or from BCMCS AccountingRequest/Response transactions. For example, application 110 may examine relevant TDR records and calculate the number of BCMCS BAK keys distributed to mobile subscribers in a give period of time. BAK key distribution statistics may include, but are not limited to, BAK key distribution per-program statistics, BAK key distribution per-time period statistics, and BAK key distribution per-subscriber statistics. Application 110 may also generate BAK distribution statistics that include geographic or subscriber location information by analyzing and correlating BCMCS parameters such as system identity (SID), network identify (NID), packet zone identity (PZID), subnet identifier (SubnetID). For example, application 110 may produce a report detailing the distribution of BCMCS program content related BAK keys to each packet zone served by BCMCS controller 152.

According to yet another aspect of the subject matter described herein, BCMCS marketing intelligence application 110 may access BCMCS-related TDR records that are associated with the viewing of BCMCS program content. As described previously, such TDR records may be based, at least in part, on information exchanged on BSN-to-AAA interface 178. As such, application 110 may calculate and report any number of BCMCS content viewing related usage statistics. For example, application 110 may examine relevant TDR records and calculate the number of BCMCS programs viewed by mobile subscribers in a given period of time. BCMCS program viewing statistics may include per-program statistics, such as how often a program was viewed, how long was the program viewed, where the subscribers were located (e.g., SID, NID, PZID, Subnet, BSN address, serving PCF ID, BSID, etc.) when they viewed the program, and other per-program statistics. BCMCS program viewing statistics may include per-subscriber statistics, such as how many programs were viewed by a subscriber or group of subscribers during a time period, which programs were viewed by a subscriber or group of subscribers during a time period, how long a program was viewed by a subscriber, what time of day a subscriber or group of subscribers viewed programs, etc. Application 110 may also generate geographic or subscriber-location-based program viewing statistics, such which, how many, and how long programs were viewed by subscribers that were serviced in or by a particular SID, NID, PZID, Subnet, BSN address, Serving PCF ID, BSID, etc. By accessing and analyzing TDR records that include octet-based accounting information, application 110 may produce statistics and reports that describe the number of octets transmitted from a content provider to the network provider.

Statistics and reports associated with any monitored BCMCS parameter or combination of BCMCS parameters may also be generated by application 110. Application 110 may utilize BCMCS parameters collected from some or all of the monitored BCMCS network interfaces described and discussed previously in this disclosure to generate BCMCS service usage statistics and reports. By accessing and analyzing BCMCS related TDR records, as described above, application 110 may generate an report BCMCS viewing statistics that are similar in form and function to conventional television viewing/rating statistics (e.g., Nielsen ratings). Exemplary BCMCS program access/viewing statistics may include, but are not limited to, the number of program information queries sent by the mobile subscriber to the BCMCS controller, the programs of interest, in other words, programs selected for additional information but not necessarily selected for viewing, the programs selected for viewing, the number of programs selected for viewing by a specified subscriber during specified time periods, the number of programs selected for viewing by a specified group of subscribers (e.g., all subscribers within one geographic region), the duration of viewing by subscriber for one or more programs, the duration of viewing by a group of subscribers for one or more programs, and when subscribers order content of specific classifications (e.g., when do subscribers order family vs. adult content).

BCMCS QoS/Troubleshooting Application

Figure 5:
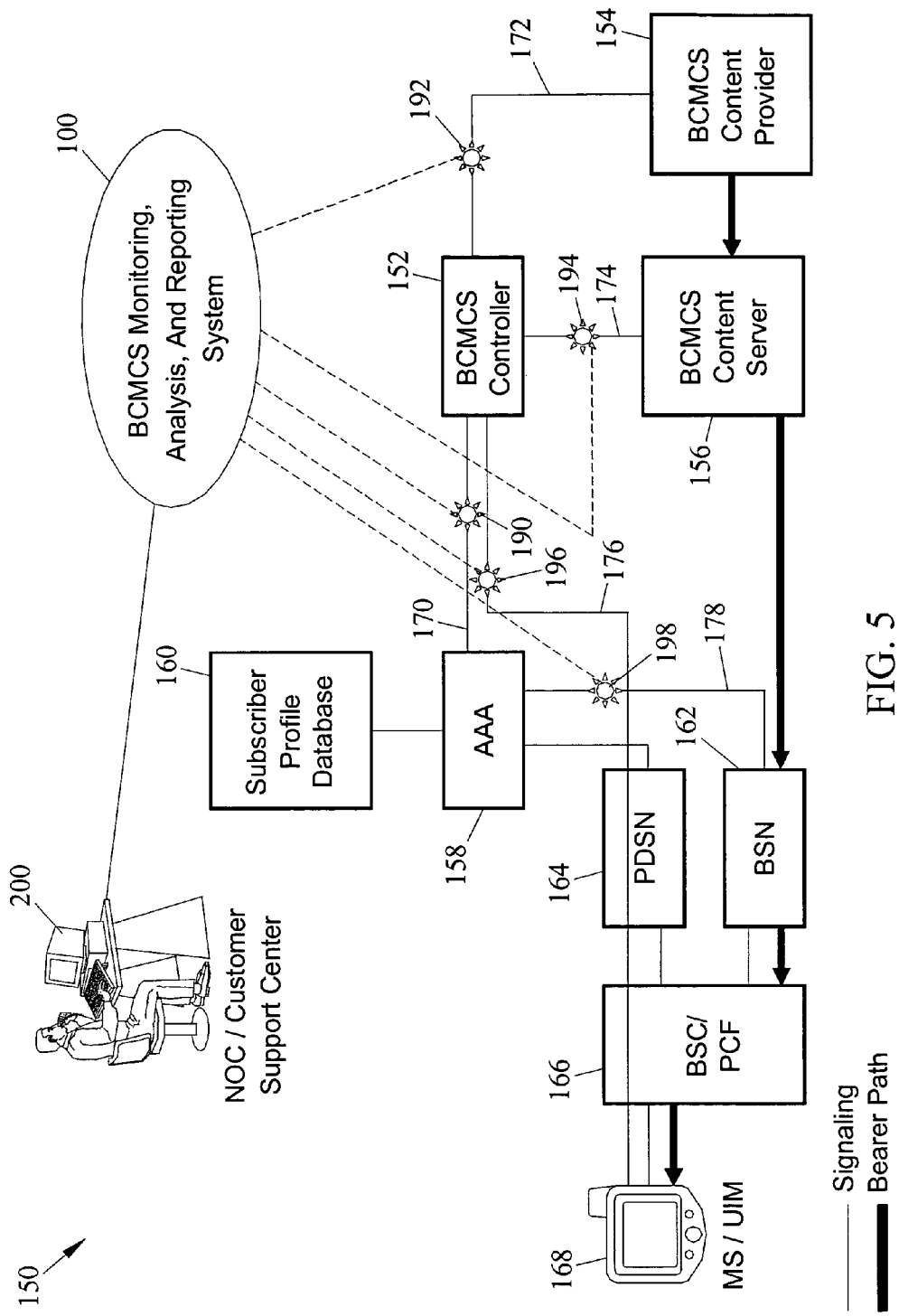
FIG. 5 is a network diagram illustrating an exemplary BCMCS monitoring, analysis, and reporting system and a network operations or customer service center for communicating with the BCMCS monitoring, analysis and reporting system according to an embodiment of the subject matter described herein.

According to another aspect of the subject matter described herein, BCMCS QoS/troubleshooting application 112 may access and analyze BCMCS related TDR records, and provide a network operations center (NOC) or BCMCS customer service center 200 with real-time or near real-time BCMCS service information, as illustrated in FIG. 5. For example, a BCMCS customer service agent at service center 200 may receive a call from a BCMCS subscriber who is having difficulty receiving a requested BCMCS program. The customer service agent provides the affected subscriber's BCMCS identifier (e.g., user name, IP address, etc.) to application 112, and application 112 accesses TDR records associated with the subscriber and presents some or all of the TDR information to the BCMCS customer service agent at service center 200, so that the customer service agent may quickly diagnose and rectify the problem. Application 112 may present the TDR information to the customer service agent in a logical, timeline-oriented manner, so that the progression of BCMCS registration, authentication, content discovery, BAK request, BAK response, R-P connection, etc., is provided in a display format that is easy to read and interpret. For instance, through analysis of one or more TDR records associated with a BCMCS service request, the customer service agent may be able to determine that the user requested the BAK key associated with the desired BCMCS program, but that the subscriber was denied authorization for the requested BAK by AAA function 158. Having this information, the customer service agent may be able to quickly edit authorization rule information associated with the subscriber in AAA function 158, thereby quickly resolving the problem and thereby allowing the subscriber to view the desired program.

The scenario described above is simply one example of how the BCMCS signaling information monitored by system 100 may be used to improve BCMCS QoS and troubleshooting response times.

BCMCS Fraud Detection Application

According to another aspect of the subject matter described herein, BCMCS fraud detection application 114 may access and analyze BCMCS information generated by BCMCS signaling message analyzer 106 and identify fraudulent or suspicious BCMCS resource usage activities. According to one embodiment, application 114 may access BCMCS TDR records from data server 108 and analyze the signaling information contained in the TDR records for signs of fraudulent usage of BCMCS resources. For example, application 114 may search TDR records for attempts by the same BCMCS subscriber to access BCMCS programming at the same time from different locations in the BCMCS network. In such a fraudulent use scenario, multiple TDR records may be located that are associated with the same subscriber ID. The TDR records may indicate that multiple BCMCS InformationAcquisitionRequest transactions were initiated by the subscriber ID at or near the same time, where the SID, NID, PZID, or Subnet signaling parameters in each transaction are not the same. In such a case, application may alert the NOC and/or send some or all of the suspicious TDR information to a fraud management authority.

In another scenario, application 114 may search TDR records for evidence of a registered BCMCS subscriber using a BAK key that was never requested or provided to the subscriber. In such a fraudulent use scenario, a first BCMCS subscriber legitimately requests and receives a BAK key for a program. The first subscriber then proceeds to give or transfer the BAK key to a second, unauthorized subscriber. The second subscriber then attempts to use the fraudulently obtained BAK key to access the associated BCMCS content. Application 114 may search for such fraudulent usage patterns by examining and analyzing TDR records containing BCMCS InformationAcquisitionRequest/Response transactions, as well as TDR records containing R-P connection or BCMCS bearer setup information.

The scenarios described above are not intended to be an exhaustive list of fraudulent BCMCS usage schemes, but instead are simply illustrative of how the BCMCS signaling information monitored by system 100 may be used to improve the detection and mitigation of fraudulent use in a BCMCS network.

BCMCS Billing Application

According to another aspect of the subject matter described herein, BCMCS billing application 116 may access and analyze BCMCS related TDR records and, using information extracted from the TDR records, generate accounting records for BCMCS related services. Such accounting records are unique, with respect to the accounting mechanisms defined in the BCMCS standards documents, in that the accounting records generated by application 116 are derived solely from intercepted BCMCS related signaling messages, rather than being generated and reported by the BCMCS network elements (e.g., BCMCS controller, AAA function, BSN, etc.). As such, by deploying a BCMCS monitoring system of the present invention that includes a billing management application, a BCMCS network operator may obtain an independent billing information feed that may be used, for example, to generate subscriber bills or perform billing verification/billing system audits.

In one embodiment, application 116 may access BCMCS TDR records from data server 108, which contain information associated with BAK keys that were distributed to a BCMCS subscriber. Application 116 may, for example, extract information from the TDR records associated with the subscriber and generate a bill or billing audit/verification report that details which BAK keys were requested and distributed to the subscriber, and when they were distributed. In the case where application 116 generates a billing verification report, the report may be used to audit or verify a BAK accounting-based BCMCS billing record that was independently generated by AAA function 158, BCMCS controller 152, or some other BCMCS related network element.

In another embodiment, application 116 access BCMCS TDR records from data server 108 that contain information obtained from BSN-AAA or PDSN-AAA information exchanges (e.g., RADIUS accounting messages) that are associated with program viewing by a BCMCS subscriber. Application 116 may extract information from the TDR records associated with the subscriber and generate a bill or billing audit/verification report that details which R-P connections were established, how long they were in place, when they were closed, and which Correlation ID was assigned to the R-P session(s), which Account Session ID was assigned to each R-P session, and which BCMCS Flow ID was associated with each R-P session, etc. In the case where application 116 generates a billing verification report, the report may be used to audit or verify an octet-accounting-based BCMCS billing record that was independently generated by AAA function 158, BCMCS controller 152, or another BCMCS network element.

Information contained in TDR records may also be used by BCMCS billing application 116 to provide audit reporting information and statistics associated with content provided to a BCMCS network operator by a content provider. Exemplary content provider audit/statistics may include the number of BCMCS program flows within a specified period of time, the number of times an individual program is provided to the BCMCS network, the number of information requests by BCMSC controller to the BCMCS content server, usage measurements for each program offered by the BCMCS network operator, usage reports for each individual program offered by a content provider, and the total number of octets transmitted from a content provider to the BCMCS network.

BCMCS Parental Control Application

Figure 6:
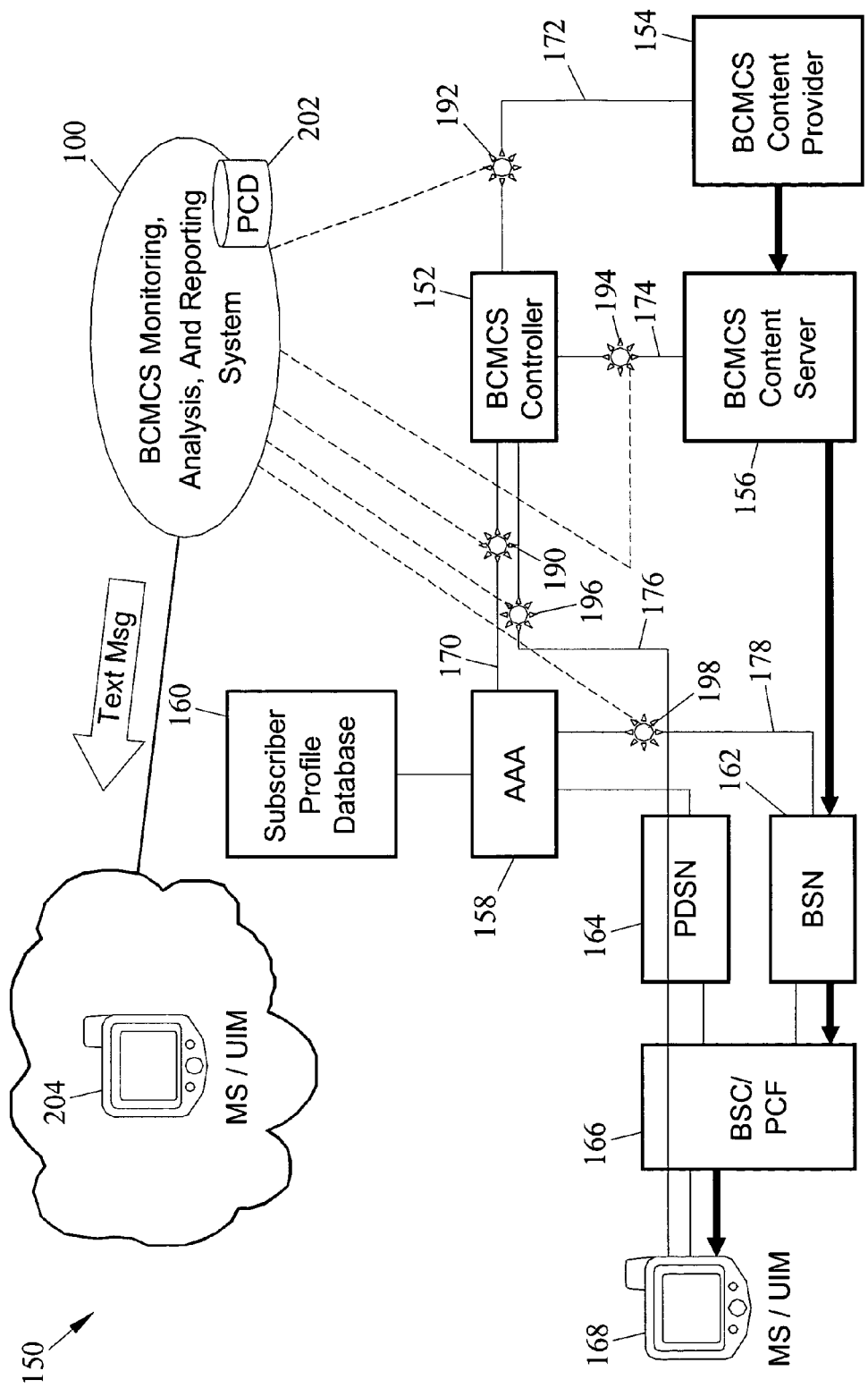
FIG. 6 is a network diagram illustrating an exemplary BCMCS monitoring, analysis and reporting system for generating a parental control notification message according to an embodiment of the subject matter described herein.

According to another aspect of the subject matter described herein, BCMCS parental control application 118 may store BCMCS program viewing rules for BCMCS subscribers in an associated parental control database 202 (FIG. 6). In one embodiment, BCMCS program viewing rules may be provisioned in the parental controls database by subscribers via an Internet or GUI interface. Alternatively, program viewing rules may be provisioned via a proprietary provisioning interface that is administered by a BCMCS network operator. According to one embodiment, BCMCS parental control application 118 may examine TDR records associated with a subscriber that has a viewing rule defined in parental control database 202. Using information extracted from the TDR records, application 118 is adapted to determine whether a currently viewed program, a previously viewed program, or a requested BCMCS program violates one or more of the parental control viewing rules that have been defined for the subscriber.

Figure 7:
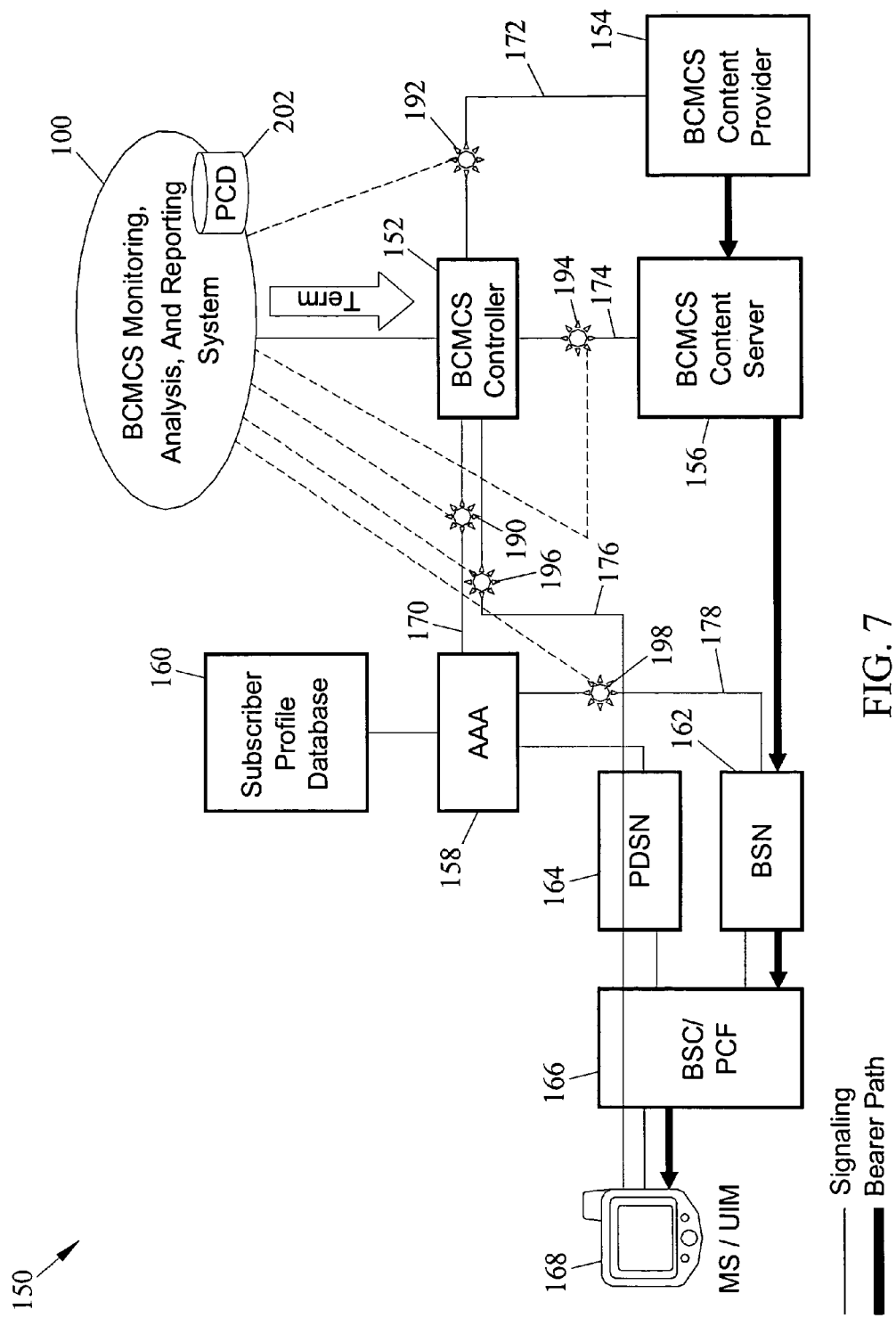
FIG. 7 is a network diagram illustrating an exemplary BCMCS monitoring, analysis and reporting system for transmitting a request to terminate a BCMCS flow to a subscriber in response to a parental control violation according to an embodiment of the subject matter described herein.

Exemplary program viewing rules are illustrated below in Table 4. Program viewing rules may include the names of programs that a subscriber is not allowed to view. Such a sample rule is illustrated in the first entry of Table 4. Subscriber 168, identified in the BCMCS network as child@vzw.net, is prohibited from viewing a BCMCS program named "The Dirty Movie". Also defined in Table 4, with regard to the first rule entry, are an Action field and a Contact field. These fields may be used to specify an action that is to be taken if the rule criteria are satisfied. In this example, if the subscriber child@vzw.net attempts to view a BCMCS program named "The Dirty Movie", application 118 may notify the subscriber's parents of the access attempt. In one embodiment, application 118 is adapted to generate a notification message, such as a short message service (SMS) message, email message, instant message, or other messaging service message, which is communicated to the parent or guardian 204 of the monitored subscriber. In this example, an SMS text notification message is generated by application 118 and communicated to the child's parents 204 at contact address (919) 469-1000, as illustrated in FIG. 6. In this example, application 118 is further adapted to block and/or terminate access to the specified BCMCS program. In one embodiment, application 118 may generate a program termination request message that may be communicated to BCMCS controller 152, AAA function 158, or BSN 162. The program termination request message may include the identity of the BCMCS subscriber that is requesting or receiving the specified program (e.g., BCMCS subscriber ID) and an identifier associated with the program that is to be blocked (e.g., BCMCS PgmName, BCMCS Flow ID, etc.). In FIG. 7, a program termination request message is communicated to BCMCS controller 152, which then proceeds to terminate access to the specified program. BCMCS controller 152 may signal and coordinate with one or more other BCMCS network elements (e.g., AAA function 158, BSN 162, etc.) to terminate delivery of the program to subscriber 168.

Program viewing rules may specify program rating levels that a subscriber is not allowed to view. Such a sample rule is illustrated in the second entry of Table 4. The subscriber, identified in the BCMCS network as teen@vzw.net, is prohibited from viewing any BCMCS programs that have been designated with a rating value of "R" or "X". It will be appreciated that program content rating systems other than the exemplary "G", "PG", "PG13", "R", and "X" system defined by the Motion Picture Association of America may be supported by the present invention. For example, the television rating system defined by the TV Parental Guidelines Board that includes "TV-Y", "TV-Y7", "TV-MA", and other rating identifiers may also be supported by application 118.

Program viewing rules may specify attributes or expanded rating values that are associated with BCMCS programming that a subscriber is not allowed to view. Such a sample rule is illustrated in the third entry of Table 4. The subscriber, identified in the BCMCS network as student@vzw.net, is not allowed to view BCMCS programming content that contains strong sexual content (SC), or which contains profanity (P). Program attributes may include, but are not limited to, Adult Content (AC), Adult Humor (AH), Adult Language (AL or L), Adult Situations (AS), Adult Theme (AT), Brief Nudity (BN), Graphic Language (GL), Graphic Violence (GV), Mature Theme (MT), Mild Violence (MV), Nudity (N), Rape (RP), and Violence (V).

Program viewing rules may specify a BCMCS program viewing "cutoff" or "curfew" time. The time value may be used to represent the latest time that a subscriber may begin viewing a BCMCS program, or the time value may be interpreted as the time at which all BCMCS programming content ceases to be delivered or made available to a subscriber. Such a sample rule is illustrated in the third entry of Table 4. The subscriber, identified in the BCMCS network as kid@vzw.net, is not allowed to view BCMCS programming after 8 pm.

TABLE 4

Exemplary Program Viewing Rules

| Subscriber ID | Program Name | Program Rating | Program Attribute | Program Curfew Time | Action | Contact |
|---|---|---|---|---|---|---|
| child@vzw.net | "The Dirty Movie" | — | — | — | Notify Block | SMS: 9194691000 |

TABLE 4-continued

Exemplary Program Viewing Rules

| Subscriber ID | Program Name | Program Rating | Program Attribute | Program Curfew Time | Action | Contact |
|---|---|---|---|---|---|---|
| teen@vzw.net | — | R, X | — | — | Block | — |
| student@vzw.net | — | — | SC, P | — | Block | — |
| kid@vzw.net | — | — | — | 8:00 pm | Block | — |

While the exemplary rules described above and illustrated in Table 4 represent an "exclusive" or "blacklist" rules paradigm, parental control viewing rules could also be implemented in an "inclusive" or "whitelist" rules paradigm. For example, a "whitelist" rule could be generated which explicitly defines the program rating levels that a subscriber is allowed to view.

Figure 8:
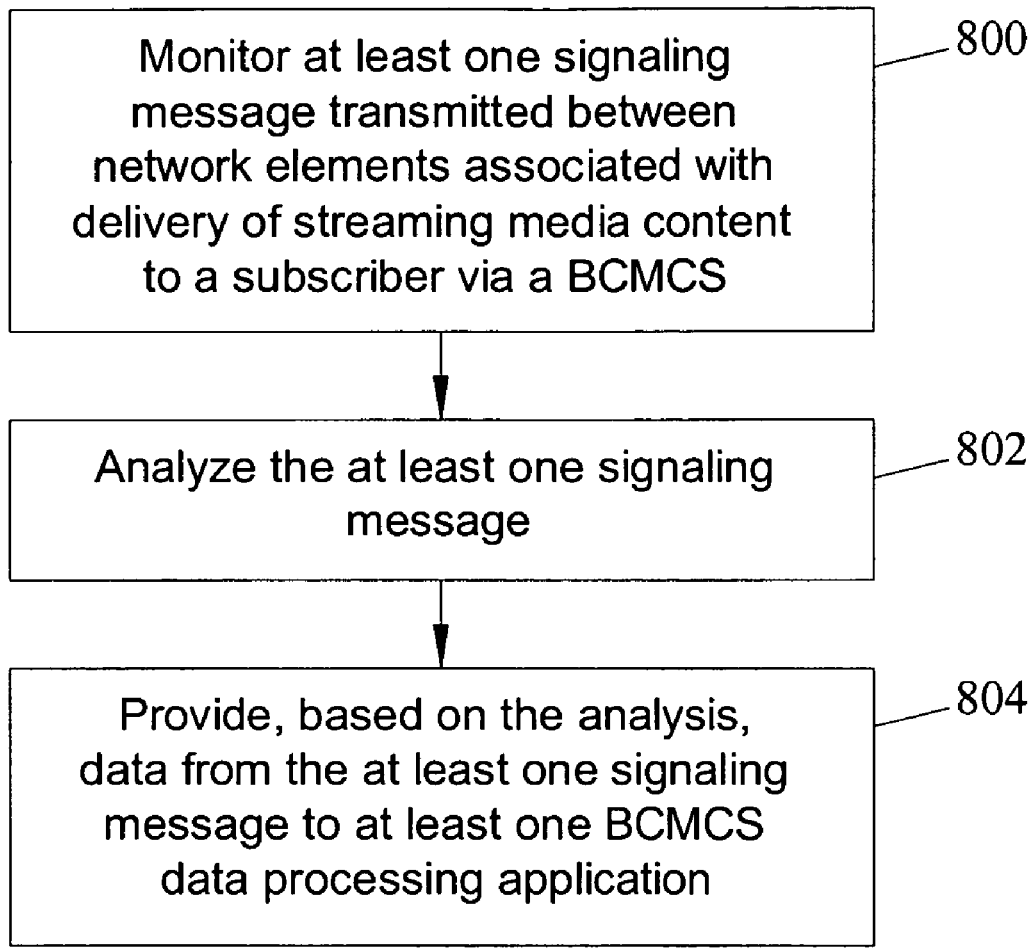
FIG. 8 is a flow chart illustrating exemplary steps for monitoring signaling messages associated with delivering streaming media content to a mobile subscriber via a BCMCS according to an embodiment of the subject matter described herein.

FIG. 8 is a flow chart illustrating exemplary steps for monitoring, analyzing, and reporting streaming media content accessed by a mobile subscriber. Referring to FIG. 8, in step 800, at least one signaling message transmitted between network elements associated with the delivery of streaming media content to the mobile subscriber via a BCMCS is monitored. In step 802, the at least one signaling message is analyzed. In step 804, data from the at least one signaling message is provided to at least one BCMCS data processing application.

The steps illustrated in FIG. 8 may be performed using a monitoring system, at least a portion of which is separate from a mobile subscriber's home network AAA function and/or from a media content server. For example, the monitoring system may be completely separate from a mobile subscriber's home AAA function. In an alternate implementation, the monitoring system may include a message feed or a TDR feed from the subscriber's home AAA function to receive message copies or TDRs generated by the subscriber's home AAA function. In either implementation, the monitoring system may include at least one component, such as a message probe or copy function, that is separate from the subscriber's home AAA function so that the monitoring system will be able to determine with greater certainty whether or not media content is actually delivered to a subscriber.

Figure 9:
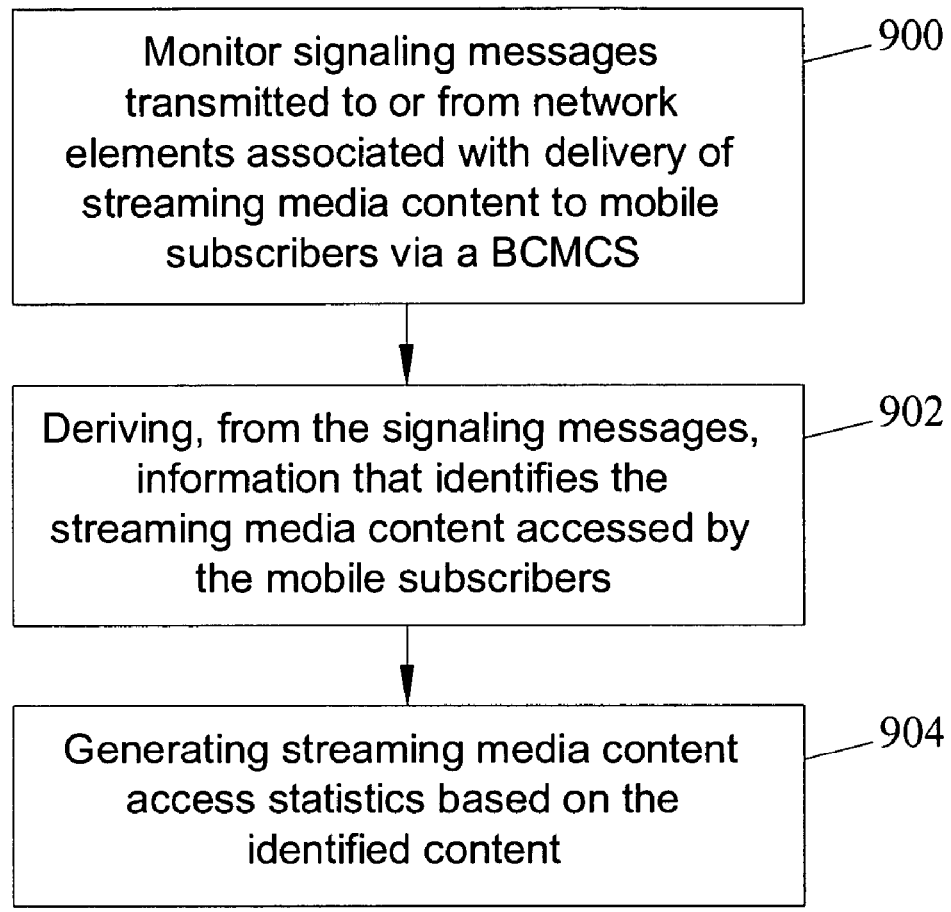
FIG. 9 is a flow chart illustrating exemplary steps for generating statistics based on streaming media content delivered to a mobile subscriber via a BCMCS according to an embodiment of the subject matter described herein.

FIG. 9 is a flow chart illustrating exemplary steps for collecting streaming media content access statistics for streaming media content accessed by mobile subscribers. Referring to FIG. 9, in step 902, a plurality of signaling messages transmitted to of from network elements that are associated with the delivery of streaming media content to mobile subscribers via a BCMCS are monitored. In step 902, information that identifies streaming media content accessed by mobile subscribers is derived from the signaling messages. In step 904, streaming media content access statistics are generated based on the identified content. The steps illustrated in FIG. 9 may be performed a monitoring function that is separate from a subscriber's home network AAA function and/or from a media content delivery server.

The subject matter described herein is not limited to monitoring signaling messages associated with delivery of streaming media content via a BCMCS to mobile devices. In an alternate implementation, any of the methods, systems, or computer program products described herein may be used to monitor signaling messages associated with delivery of streaming media content via a BCMCS to wireline devices, such as wireline telephones capable of storing or displaying streaming media content or computers capable of storing or displaying streaming media content.

It will be understood that various details of the invention may be changed without departing from the scope of the invention. Furthermore, the foregoing description is for the purpose of illustration only, and not for the purpose of limitation, as the invention is defined by the claims as set forth hereinafter.

What is claimed is:

1. A method for monitoring, analyzing, and reporting streaming media content accessed by a subscriber, via a broadcast and multicast service (BCMCS) the method comprising:
using a monitoring system, at least a portion of which is separate from a subscriber's home network authentication, authorization, and accounting (AAA) function and which is also separate from mobile stations (MSs) and base station controllers (BSCs):
(a) monitoring at least one signaling message transmitted between network elements associated with the delivery of streaming media content to a subscriber via a BCMCS;
(b) analyzing the at least one signaling message; and
(c) providing, based on the analysis, data from the at least one signaling message to at least one BCMCS data processing application.

2. The method of claim 1 wherein monitoring at least one signaling message includes monitoring at least one signaling message associated with establishing a media connection for delivering the streaming media content to the subscriber.

3. The method of claim 2 comprising, determining, based on the at least one signaling message, whether the streaming media content is delivered to the subscriber.

4. The method of claim 1 wherein monitoring at least one signaling message includes monitoring a broadcast and multicast service (BCMCS) service discovery/announcement signaling message.

5. The method of claim 1 wherein monitoring at least one signaling message includes monitoring a BCMCS InformationAcquisition signaling message.

6. The method of claim 1 wherein monitoring at least one signaling message includes monitoring a BCMCS related RADIUS signaling message.

7. The method of claim 6 wherein the RADIUS signaling message includes BCMCS accounting information.

8. The method of claim 6 wherein the RADIUS signaling message includes BCMCS access authorization information.

9. The method of claim 1 wherein monitoring at least one signaling message includes monitoring at least one signaling message transmitted to or from a BCMCS controller.

10. The method of claim 1 wherein monitoring at least one signaling message includes monitoring at least one signaling message transmitted to or from a BCMCS content server.

11. The method of claim 1 wherein monitoring at least one signaling message includes monitoring at least one signaling message transmitted to or from an authentication, authorization, and accounting function.

12. The method of claim 1 wherein monitoring at least one signaling message includes monitoring at least one signaling message transmitted to or from a BCMCS content provider node.

13. The method of claim 1 wherein monitoring at least one signaling message includes monitoring at least one signaling message transmitted to or from a broadcast serving node (BSN).

14. The method of claim 1 wherein analyzing the at least one signaling messages includes correlating a plurality of signaling messages relating to the same BCMCS media content delivery transaction.

15. The method of claim 14 comprising generating, based on the correlating, a streaming media content transaction detail record (TDR) that includes information from the signaling messages.

16. The method of claim 1 wherein providing data from the at least one signaling message to at least one BCMCS data processing application includes providing the data to a BCMCS market intelligence application.

17. The method of claim 16 comprising generating streaming media content viewing statistics using the BCMCS market intelligence application.

18. The method of claim 17 wherein the streaming media content viewing statistics include statistics that indicate the number of times a streaming media program was accessed by subscribers.

19. The method of claim 17 wherein the streaming media content viewing statistics include statistics that indicate the geographic location of subscribers accessing streaming media program content.

20. The method of claim 17 wherein the streaming media content viewing statistics include statistics that indicate the time of day viewing habits of subscribers accessing streaming media program content.

21. The method of claim 1 wherein providing data from the at least one signaling message to at least one BCMCS data processing application includes providing the data to a BCMCS quality of service (QoS)/troubleshooting application.

22. The method of claim 21 comprising using the BCMCS QoS/troubleshooting application to provide a network operator with a view of streaming media content access related signaling information associated with the subscriber.

23. The method of claim 1 wherein providing data from the at least one signaling message to at least one BCMCS data processing application includes providing the data to a BCMCS fraud detection application.

24. The method of claim 23 comprising using the fraud detection application to identify potentially fraudulent use of streaming media network resources.

25. The method of claim 1 wherein providing data from the at least one signaling message to at least one BCMCS data processing application includes providing the data to a BCMCS billing application.

26. The method of claim 25 comprising generating, using the billing application, billing verification reports usable to audit billing records generated by other network elements involved in the delivery of streaming media content to subscribers.

27. The method of claim 1 wherein providing data from the at least one signaling message to at least one BCMCS data processing application includes providing the data to a BCMCS parental control application.

28. The method of claim 27 comprising activating the BCMCS parental control application to evaluate and enforce a parental control rule associated with the subscriber.

29. The method of claim 28 wherein evaluating and enforcing a parental control rule associated with a subscriber includes generating and sending a parental control notification message in response to determining a parental control rule associated with the subscriber is violated.

30. The method of claim 28 wherein evaluating and enforcing a parental control rule associated with a subscriber includes generating and sending a streaming media session termination request message in response to determining a parental control rule associated with the subscriber is violated.

31. A method for collecting streaming media content access statistics for streaming media content accessed by subscribers via a broadcast and multicast service (BCMCS), the method comprising:
(a) monitoring, using a monitoring system, at least a portion of which is separate from a subscriber's home network authentication, authorization, and accounting (AAA) function, and which is also separate from mobile stations (MSs) and base station controllers (BSCs), a plurality of signaling messages transmitted to or from network elements that are associated with delivery of streaming media content to subscribers via a BCMCS;
(b) deriving, from the signaling messages, information which identifies the streaming media content accessed by the subscribers; and
(c) generating streaming media content access statistics based on the identified content.

32. The method of claim 31 wherein generating streaming media content access statistics includes generating ratings for video programming delivered to subscribers.

33. The method of claim 32 wherein generating ratings for video programming delivered to users includes generating ratings based on the establishment of R-P connections to subscribers.

34. The method of claim 31 wherein generating streaming media content access statistics includes generating ratings for video programming that is authorized to be delivered to subscribers.

35. The method of claim 34 wherein generating ratings for video programming that is authorized to be delivered to users includes generating ratings based on the distribution of broadcast access keys (BAKs) to subscribers.

36. The method of claim 31 wherein performing steps (a)-(c) includes performing steps (a)-(c) using a monitoring function separate from the subscriber's home network authentication, authorization, and accounting (AAA) function and from a media content server.

37. A network data collection system for monitoring, analyzing and reporting signaling information associated with streaming media content accessed by a subscriber via a broadcast and multicast service (BCMCS), the system comprising:
(a) a BCMCS signaling message monitoring function, at least a portion of which is separate from a subscriber's home authentication, authorization, and accounting node, and which is also separate from mobile stations (MSs) and base station controllers (BSCs) for monitoring at least one signaling message transmitted between network elements that are associated with the delivery of streaming media content to the subscriber via a BCMCS; and (b) a BCMCS signaling message analyzer function for analyzing the at least one signaling message and for providing information from the analysis to at least one BCMCS data processing application.

38. The system of claim 37 wherein the BCMCS signaling message monitoring function is adapted to monitor at least one signaling message associated with establishment of a media connection for delivering the streaming media content to the subscriber.

39. The system of claim 38 wherein the BCMCS signaling message analyzer function is adapted to determine, base on the at least one signaling message associated with the establishment of the media connection, whether the streaming media content is delivered to the subscriber.

40. The system of claim 37 wherein the BCMCS signaling message monitoring function includes an external signaling link monitoring probe.

41. The system of claim 37 wherein the BCMCS signaling message monitoring function is integrated with a network element associated with the delivery of streaming media content to subscribers via the BCMCS.

42. The system of claim 37 comprising a data server for receiving the information from the BCMCS signaling message analyzer function and for providing the information to the at least one BCMCS data processing application.

43. The system of claim 37 comprising a BCMCS market intelligence application and wherein the BCMCS signaling message analyzer function is adapted to provide the information to the market intelligence application.

44. The system of claim 37 comprising a BCMCS quality of service/troubleshooting application and wherein the BCMCS signaling message analyzer function is adapted to provide the information to the quality of service/troubleshooting application.

45. The system of claim 37 comprising a BCMCS fraud detection application and wherein the BCMCS signaling message analyzer function is adapted to provide the information to the BCMCS fraud detection application.

46. The system of claim 37 comprising a BCMCS billing application and wherein the BCMCS signaling message analyzer function is adapted to provide the information to the BCMCS billing application.

47. The system of claim 37 comprising a BCMCS parental controls application and wherein the BCMCS signaling message analyzer is adapted to provide the information to the BCMCS parental controls application.

48. A computer program product comprising computer executable instructions embodied in a computer readable medium for performing steps:
   using a monitoring system, at least a portion of which is separate from a subscriber's home network authentication, authorization, and accounting (AAA) function and which is also separate from mobile stations (MSs) and base station controllers (BSCs):
   (a) monitoring at least one signaling message transmitted between network elements that are associated with the delivery of streaming media content to a subscriber via a broadcast and multicast service (BCMCS);
   (b) analyzing the at least one signaling message; and
   (c) providing, based on the analysis, data from the at least one signaling message to at least one BCMCS data processing application media service application.

49. A computer program product comprising computer executable instructions embodied in a computer readable medium for performing steps comprising:
   (a) monitoring, using a monitoring system, at least a portion of which is separate from a subscriber's home network authentication, authorization, and accounting (AAA) function, and which is also separate from mobile stations (MSs) and base station controllers (BSCs), a plurality of signaling messages transmitted to or from network elements that are associated with the delivery of streaming media content to subscribers via a broadcast and multicast service (BCMCS);
   (b) deriving, from the signaling messages, information which identifies the streaming media content accessed by the subscribers; and
   (c) generating streaming media content access statistics based on the identified content.

* * * * *